Figure 1:
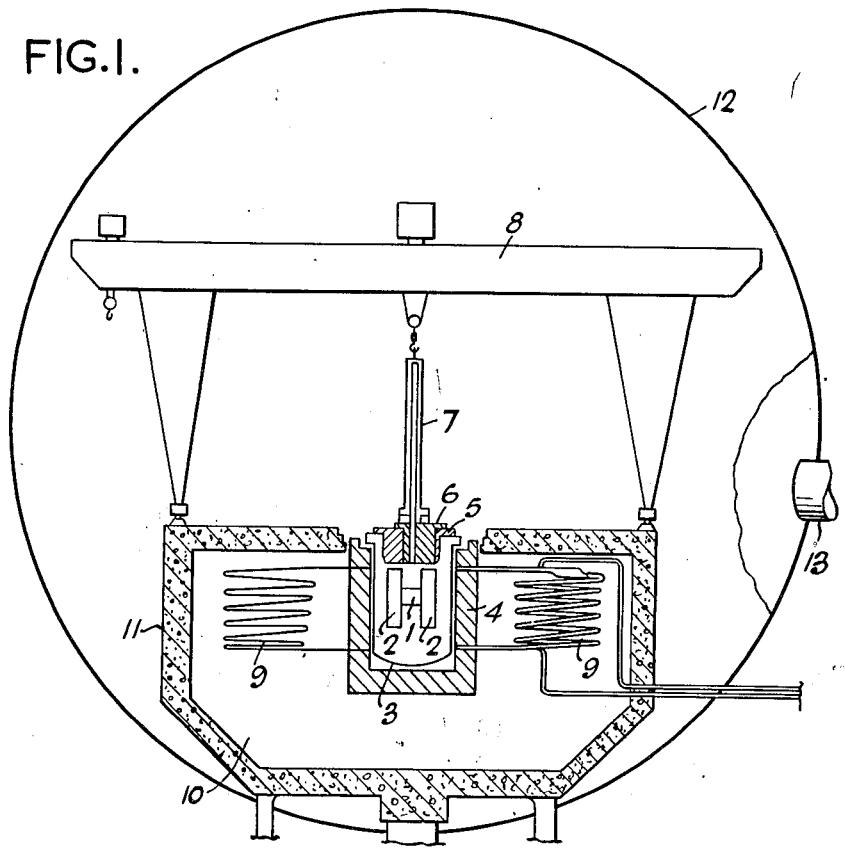

Sept. 18, 1962 J. TATLOCK ETAL 3,054,741
NUCLEAR REACTOR CONTROL ASSEMBLIES
Filed June 7, 1957 26 Sheets-Sheet 1

Sept. 18, 1962   J. TATLOCK ETAL   3,054,741
NUCLEAR REACTOR CONTROL ASSEMBLIES
Filed June 7, 1957   26 Sheets-Sheet 2

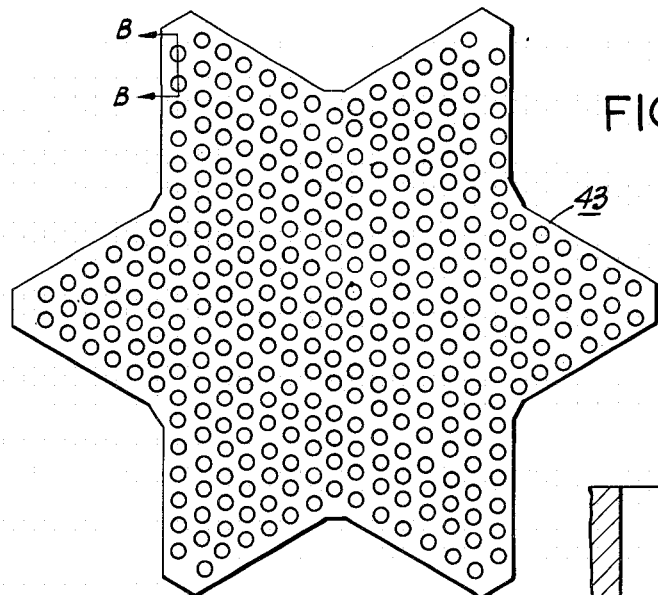
FIG.3A.
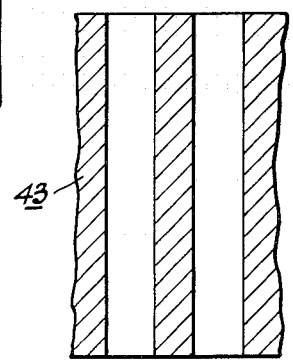
FIG.3B.
FIG.3C.
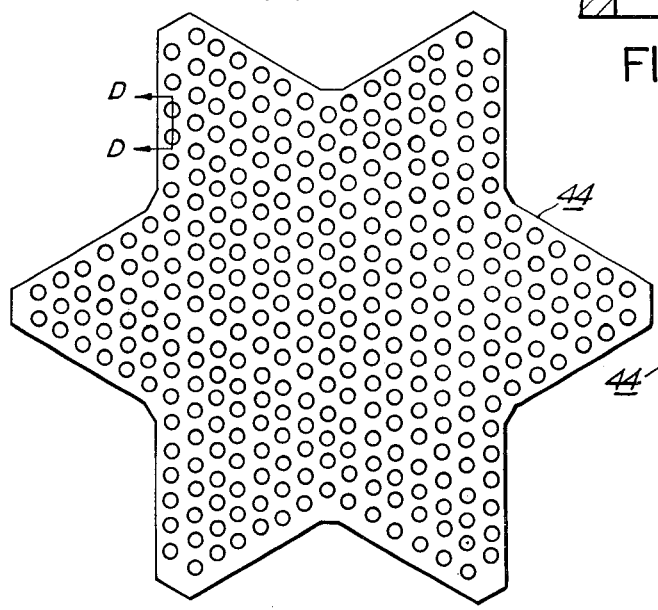
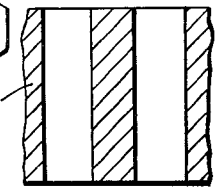
FIG.3D.

Sept. 18, 1962 J. TATLOCK ETAL 3,054,741
NUCLEAR REACTOR CONTROL ASSEMBLIES
Filed June 7, 1957 26 Sheets-Sheet 5
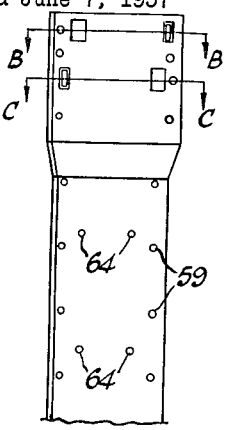
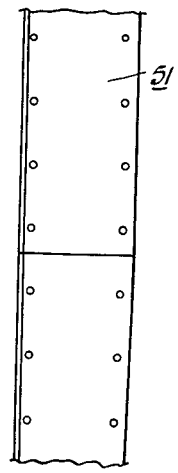
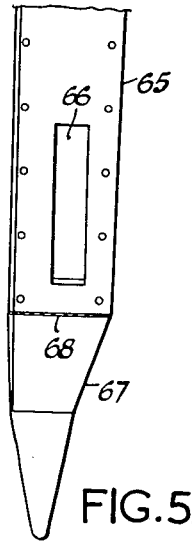
FIG.5A.
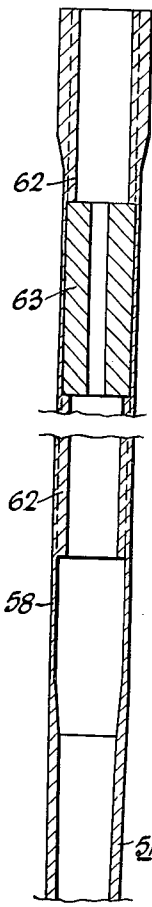
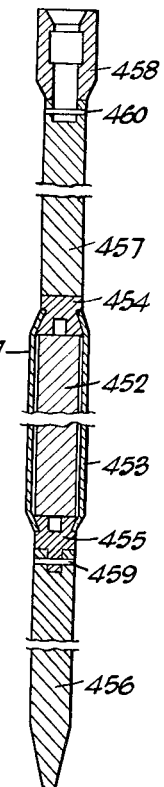
FIG.5D.
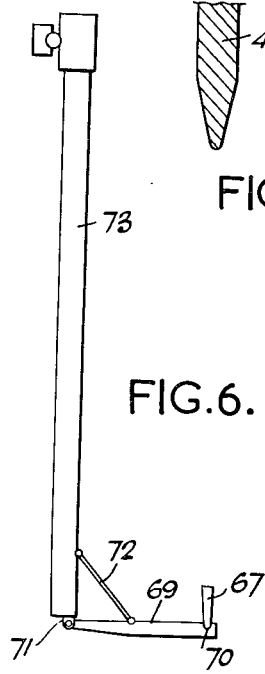
FIG.24.
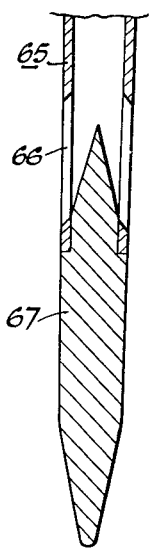
FIG.6.

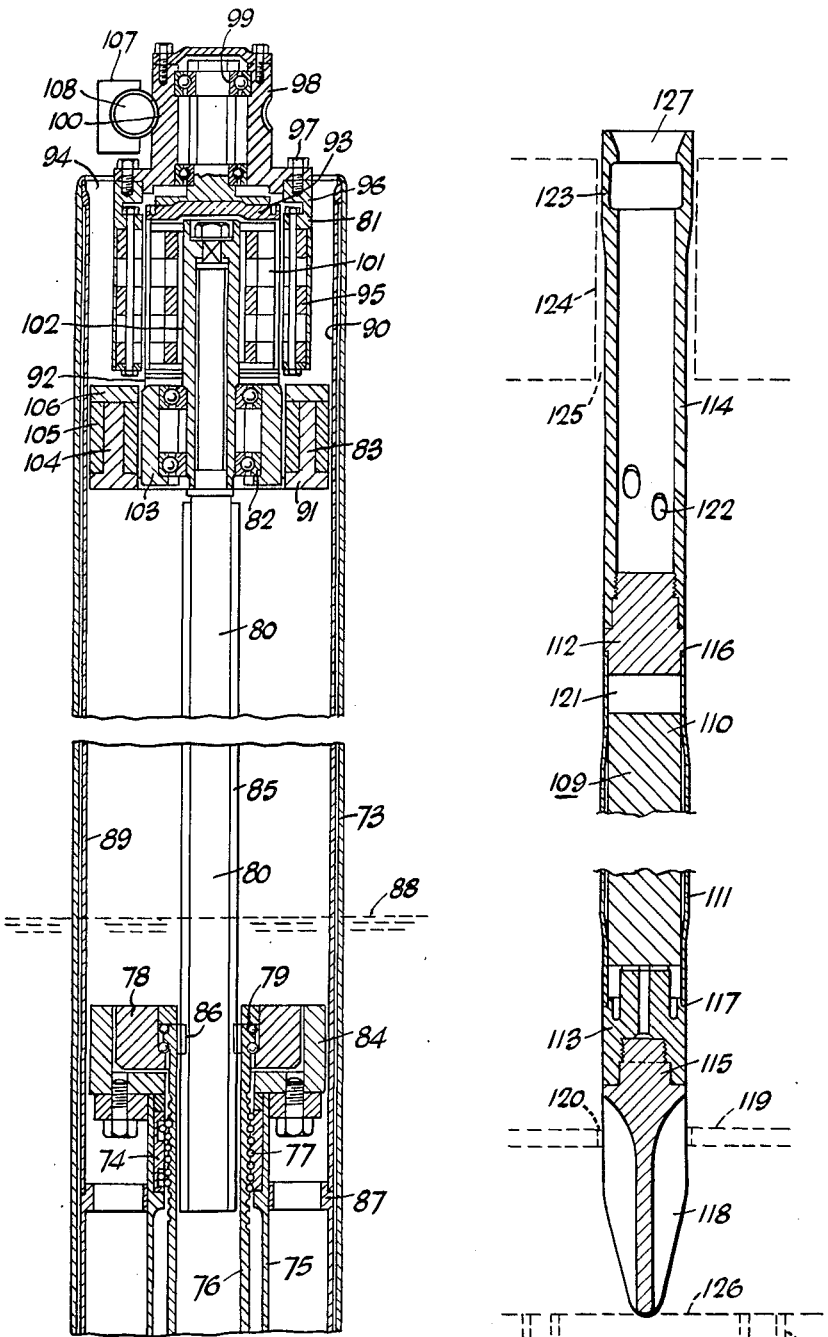

Sept. 18, 1962 J. TATLOCK ETAL 3,054,741
NUCLEAR REACTOR CONTROL ASSEMBLIES
Filed June 7, 1957 26 Sheets-Sheet 9

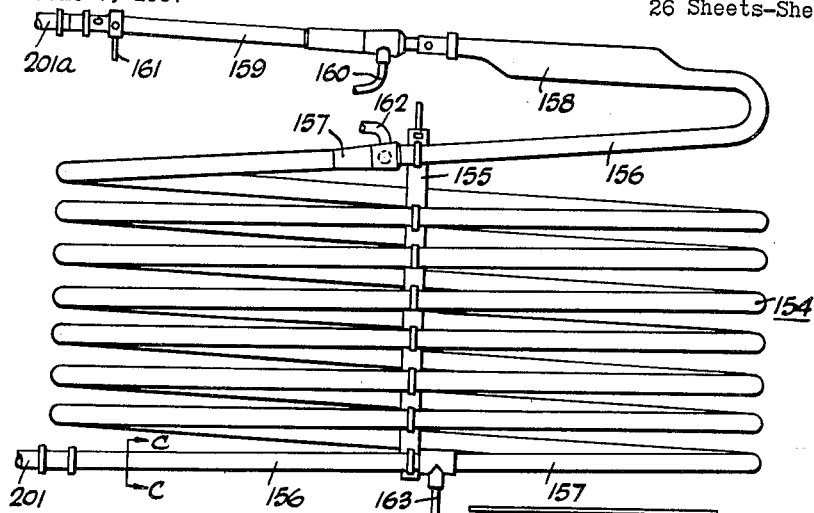
FIG. 11A.
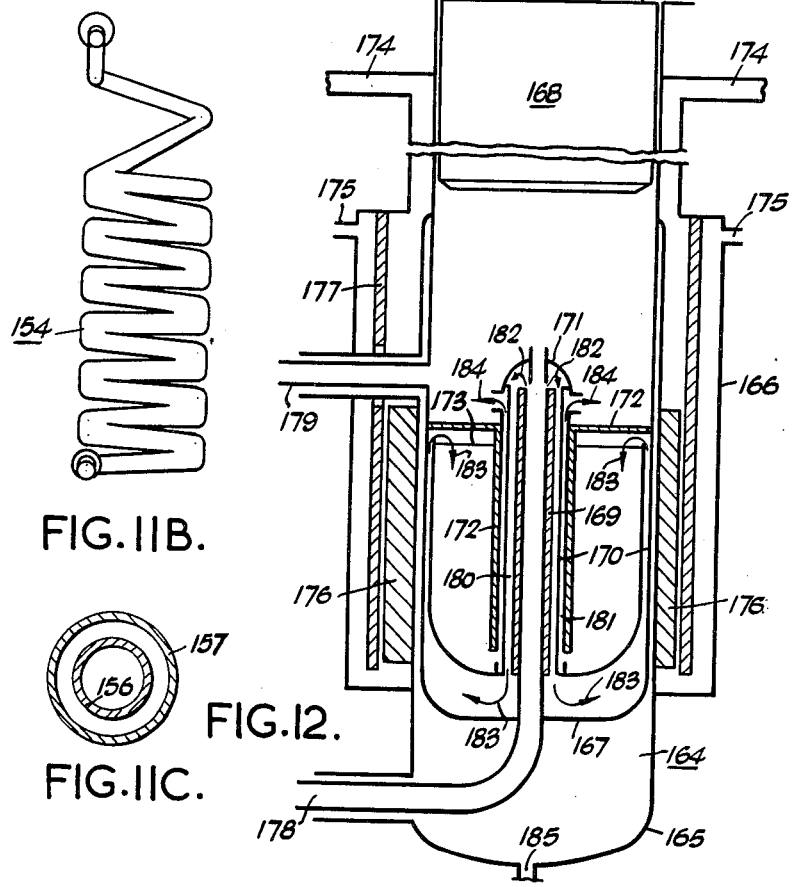
FIG. 11B.
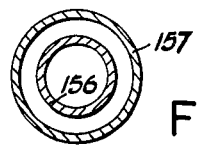
FIG. 11C.
FIG. 12.

Sept. 18, 1962 J. TATLOCK ETAL 3,054,741
NUCLEAR REACTOR CONTROL ASSEMBLIES
Filed June 7, 1957 26 Sheets-Sheet 12

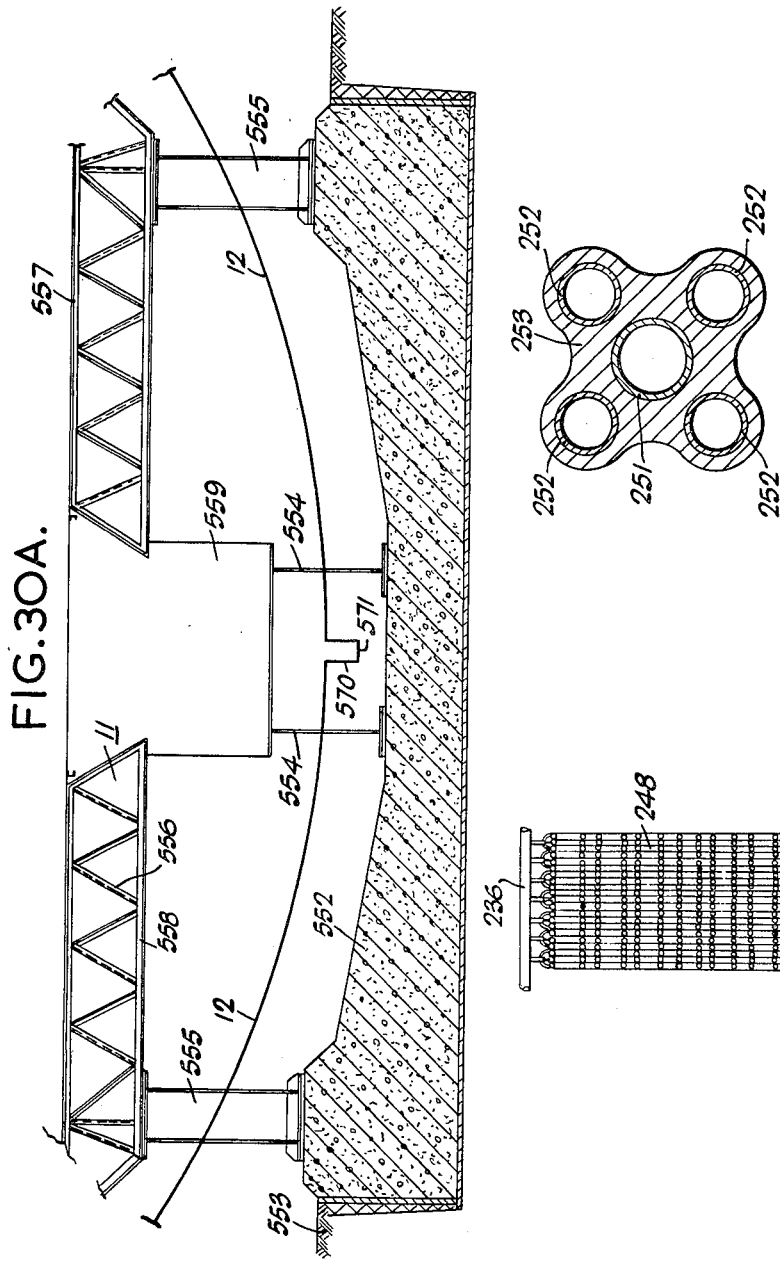

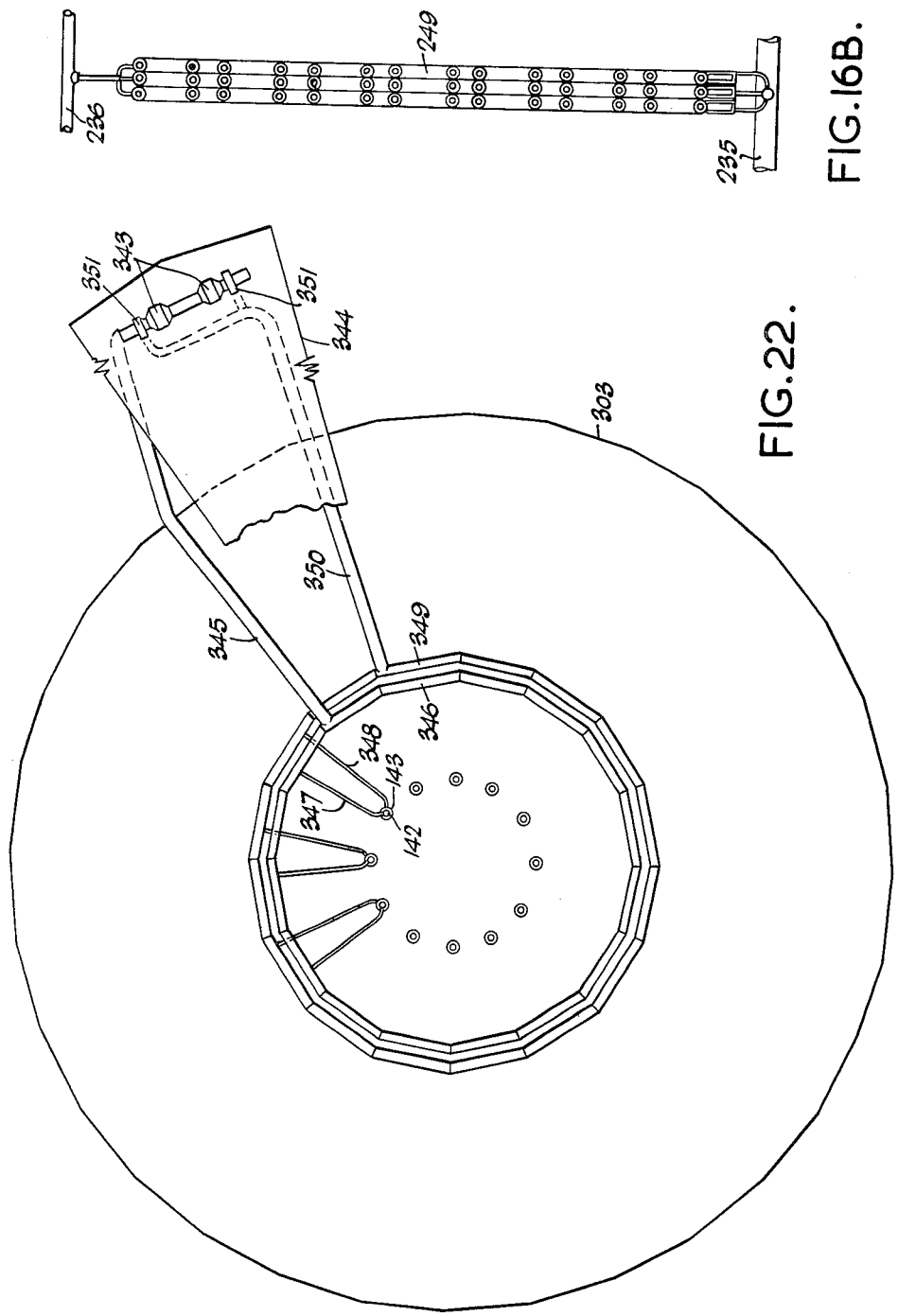

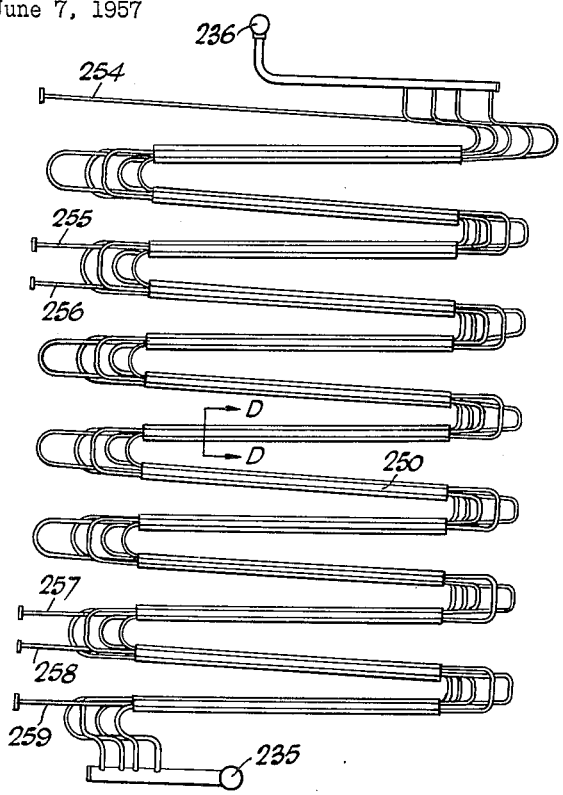
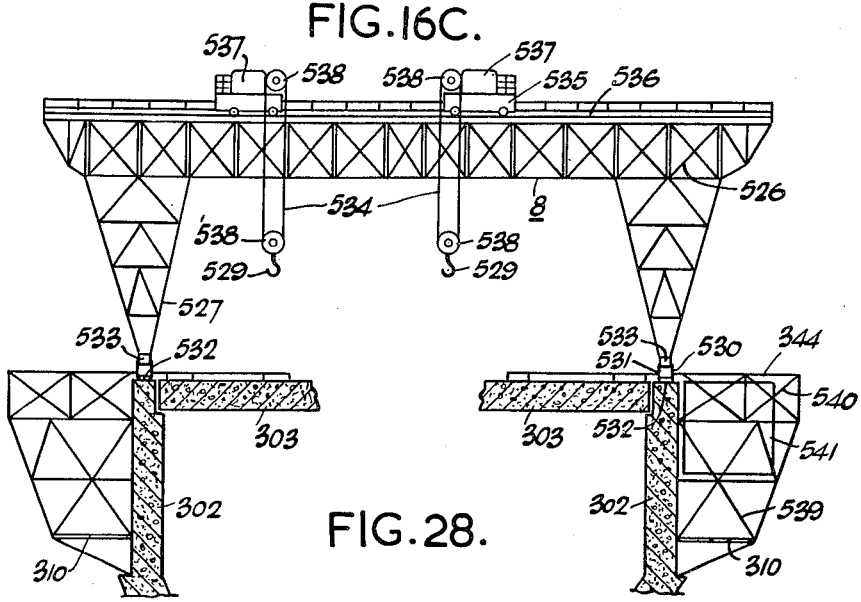
FIG.16C.
FIG.28.

Sept. 18, 1962  J. TATLOCK ETAL  3,054,741
NUCLEAR REACTOR CONTROL ASSEMBLIES
Filed June 7, 1957  26 Sheets-Sheet 16

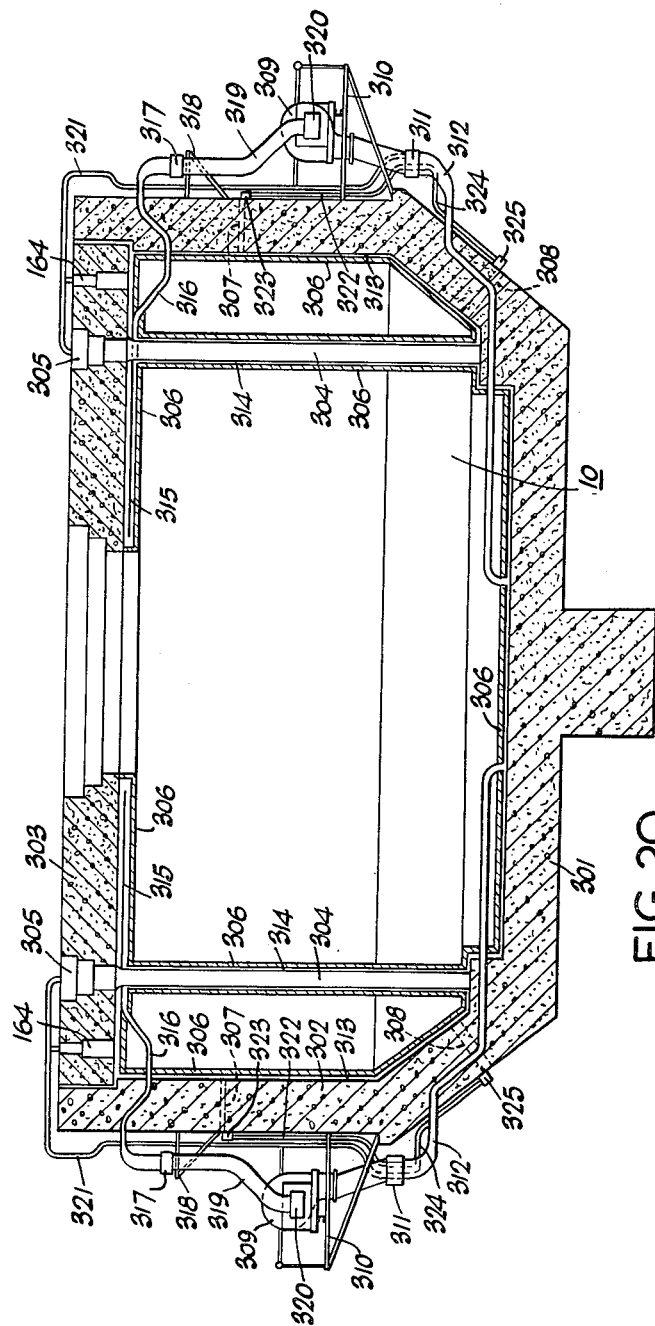

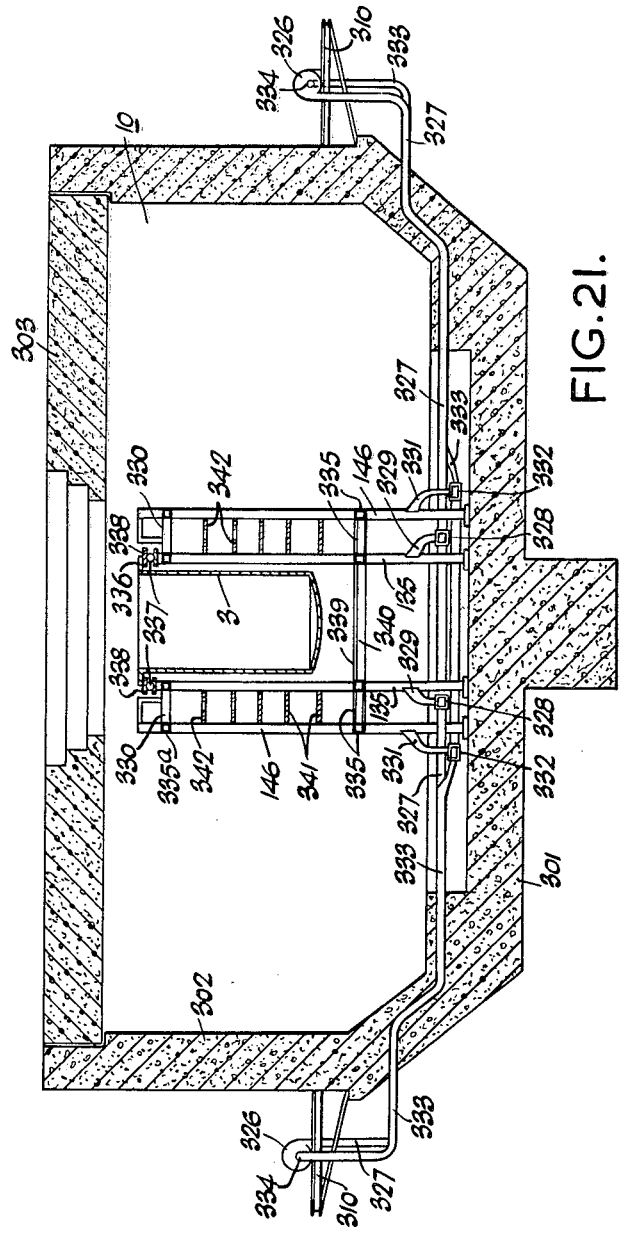

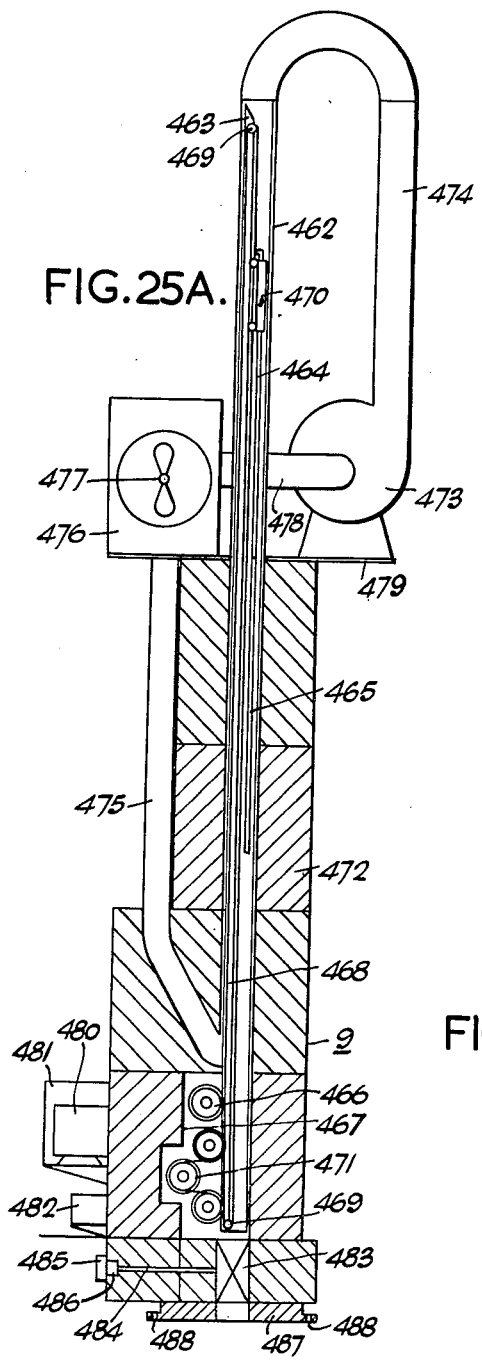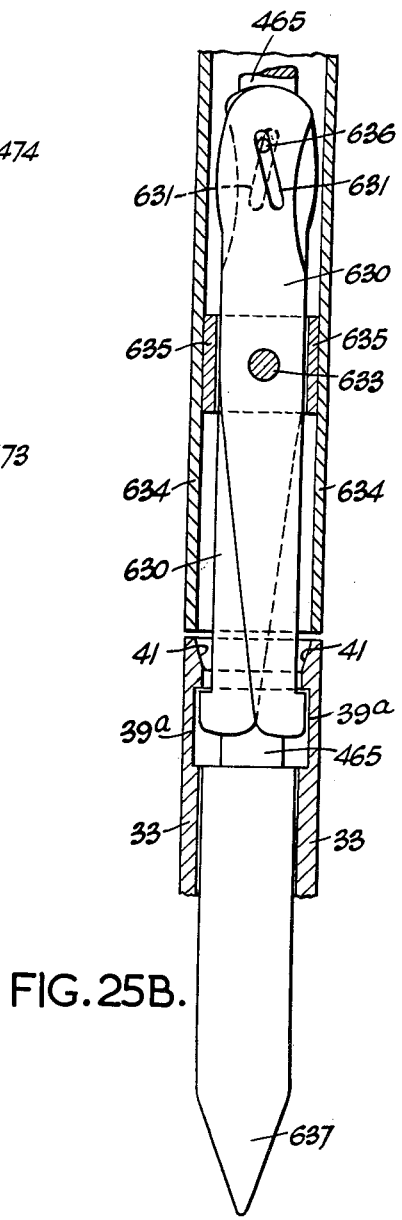
FIG. 25A.
FIG. 25B.

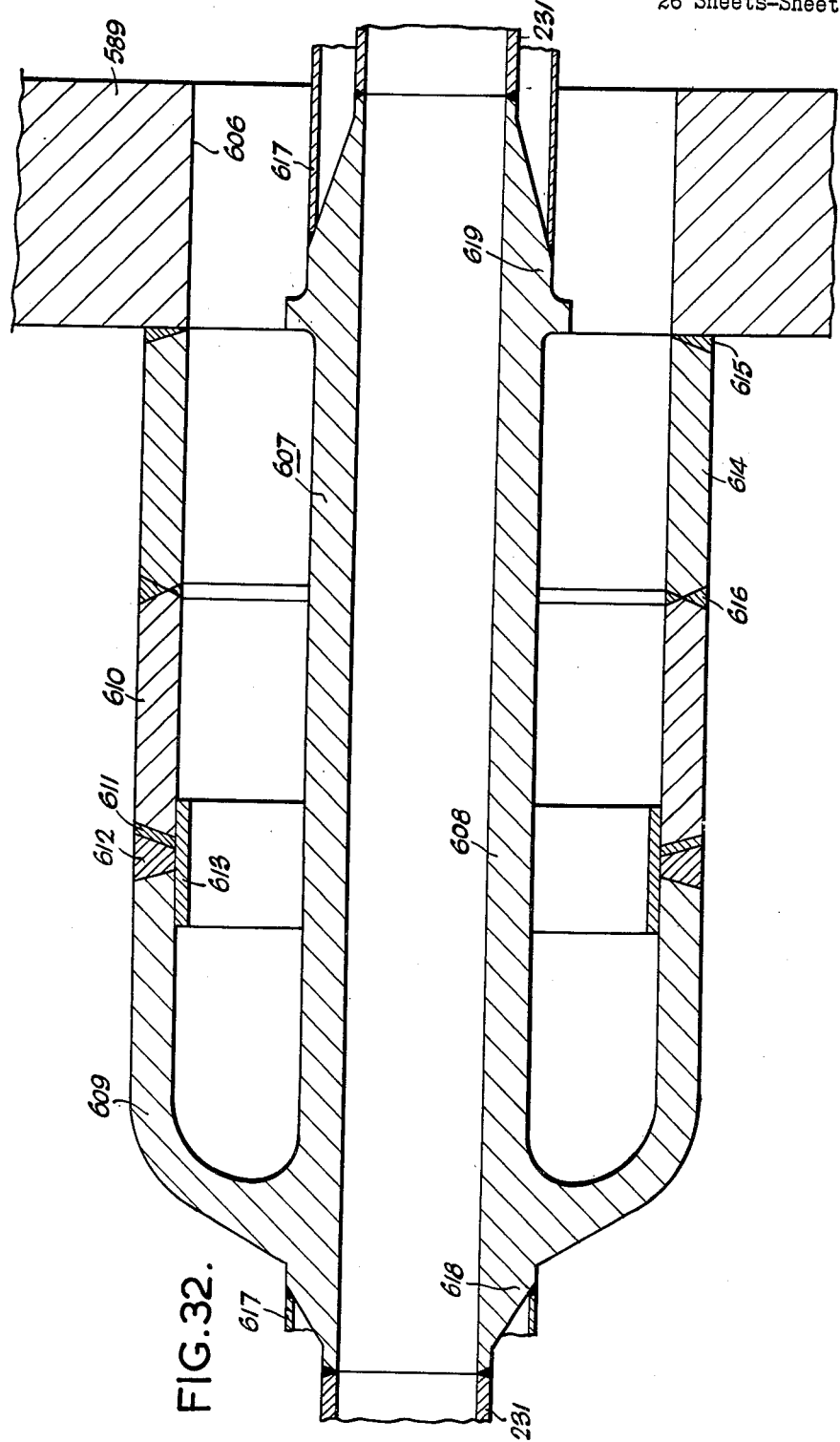

United States Patent Office 3,054,741
Patented Sept. 18, 1962

3,054,741
NUCLEAR REACTOR CONTROL ASSEMBLIES
John Tatlock, Culcheth, near Warrington, and John Alexander Forbes Glass, Woolton, Liverpool, England, assignors to United Kingdom Atomic Energy Authority, London, England
Filed June 7, 1957, Ser. No. 664,414
Claims priority, application Great Britain Mar. 13, 1957
3 Claims. (Cl. 204—193.2)

This invention relates to nuclear reactors.

The development of nuclear reactors has produced first the "thermal" reactor, that is a reactor wherein fission of the U-235 isotope present in natural uranium was caused by neutrons moderated in their energy to be in thermal equilibrium with their surroundings and has produced subsequently reactors utilising neutrons for fission having an energy in excess of 0.1 mev. and providing improved utilisation of uranium. (See for example the reactors disclosed in International Conference on the Peaceful Uses of Atomic Energy, Geneva, 1955, Papers A/CONF.8/P/491, at pages 134–142, vol. III, and A/CONF.8/P/501, at pages 330–344, vol. III.) Such reactors are called fast reactors and it is with this type of reactor that the present invention is concerned.

In order to sustain a chain reaction in a fast reactor the core of nuclear fuel is necessarily made as compact as possible, bearing in mind that means for cooling the reactor must be supplied. This may be achieved either by a fluid core with coolant pipes, or by a fluid core continuously bled through a heat exchanger, or by a core of solid fuel assembled from separate fuel elements (or sections of a fuel block) swept by the minimum practical cross-sectional area of coolant. The demand for compactness of the core appears to thwart any conventional device for introducing neutron absorbing material into the core for control purposes and accordingly other means of controlling the reactivity of the core must be sought.

The present invention provides support for a fast reactor core of fuel elements with means allowing the insertion and withdrawal of neutron generating material, i.e. part of the fissile core, for control purposes.

According to the invention support for a fast reactor core of fuel elements comprises a star shaped fuel element support plate, a star shaped fuel element locating plate, an inner skirt of star shaped section arranged to space apart the support and locating plates, an outer skirt arranged relative to the inner skirt so as to be spaced therefrom except along ridges of the inner skirt, division plates from the outer skirt to valleys of the inner skirt arranged so that said division plates divide cavities between the inner and outer skirts into sectors, control fuel element carrier frames of like section to said sectors, and means for moving said carrier frames into and out from said sectors.

Figure 18:
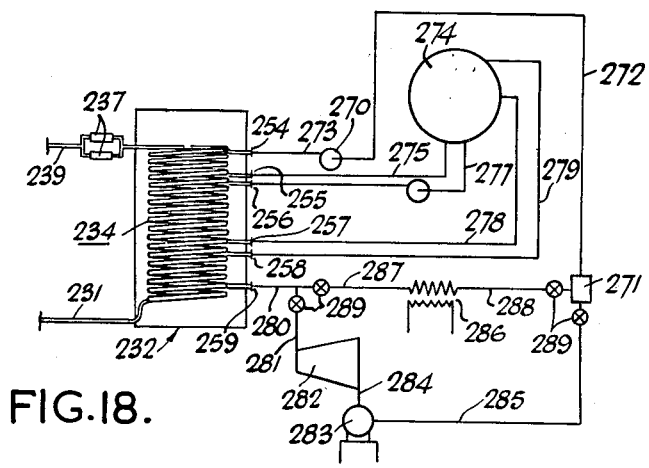
Figure 2A:
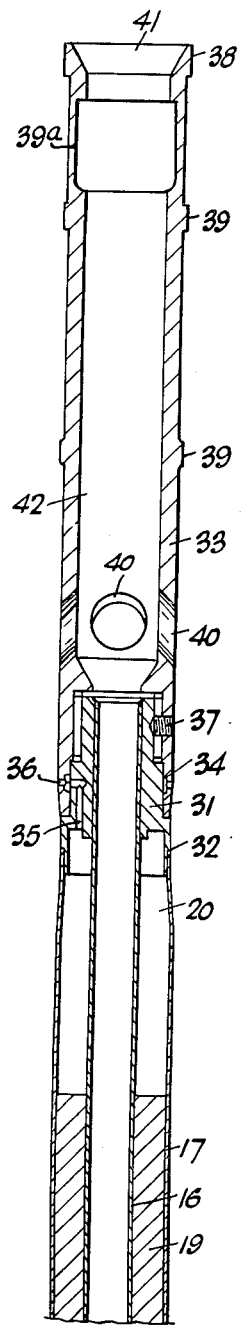
Figure 2B:
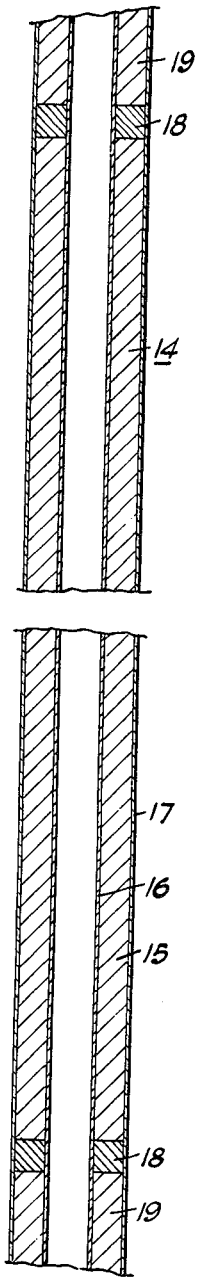
Figure 2C:
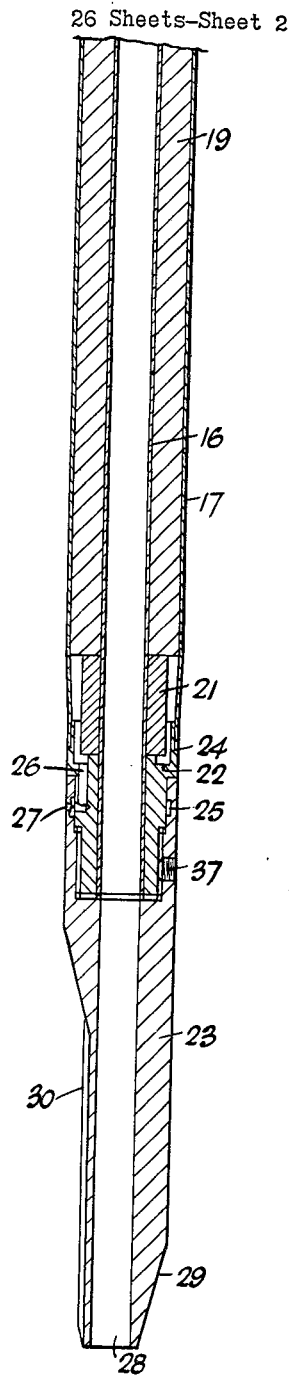
Figure 4:
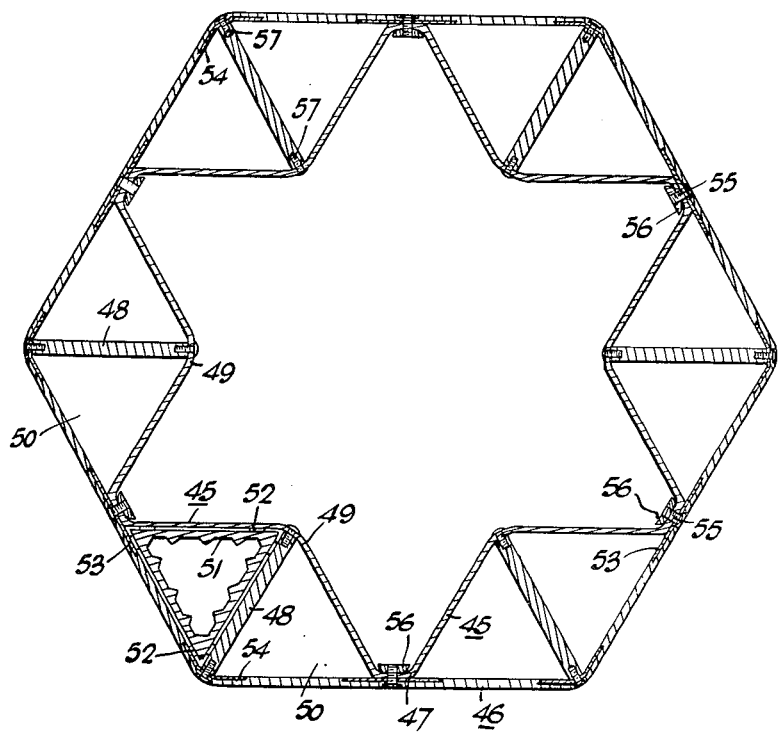
Figure 5B:
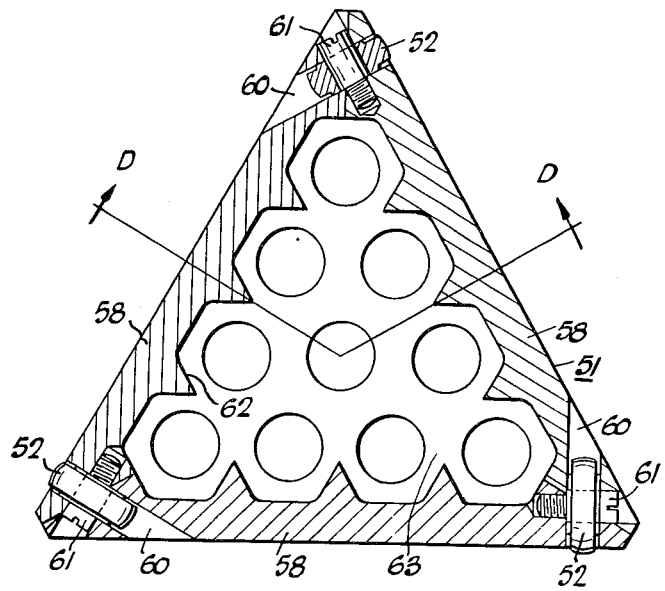
Figure 5C:
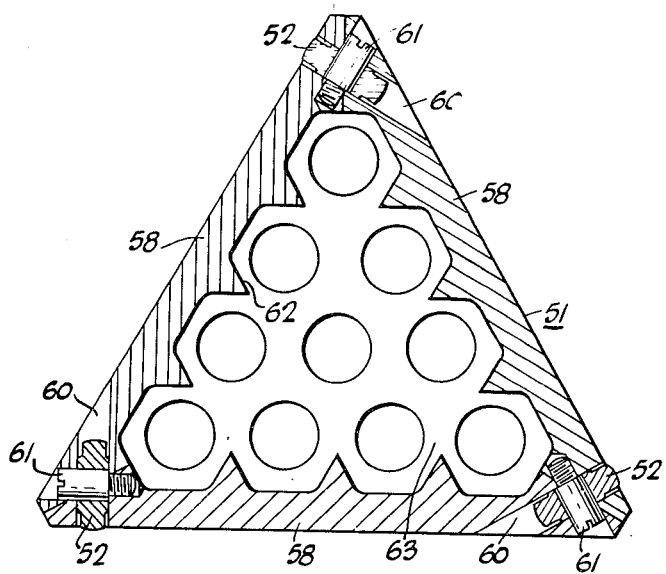
Figure 9:
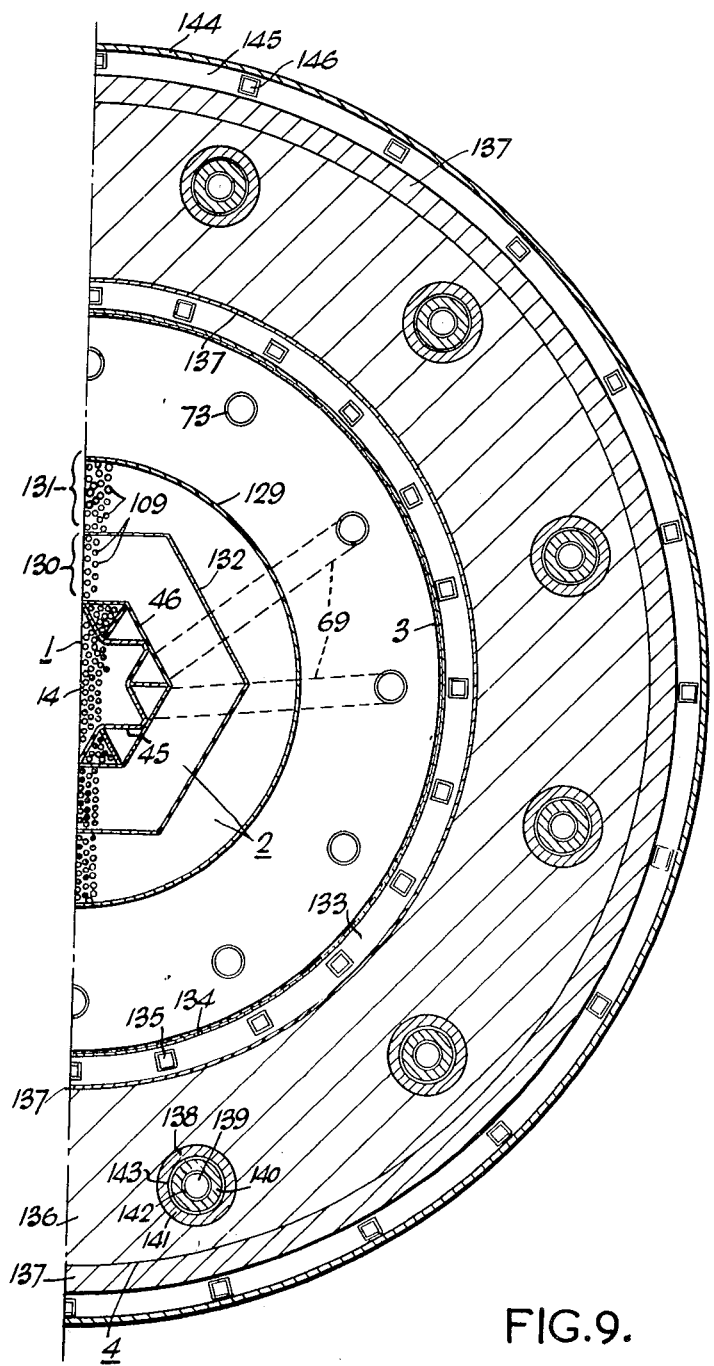
Figure 10:
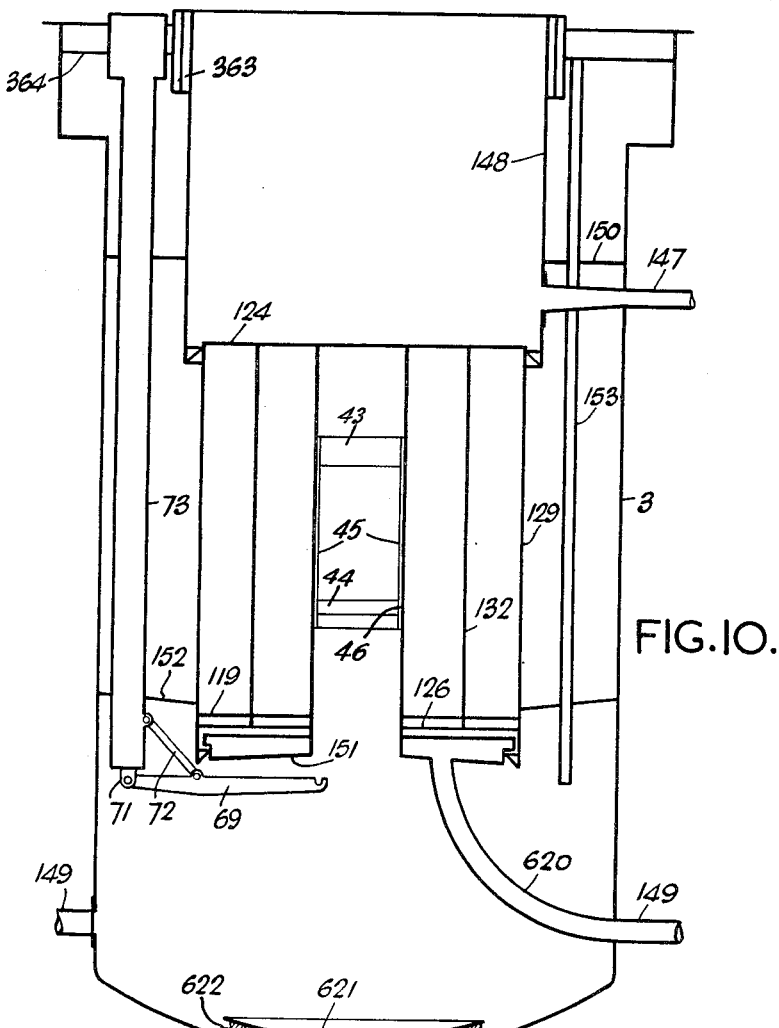
Figure 14:
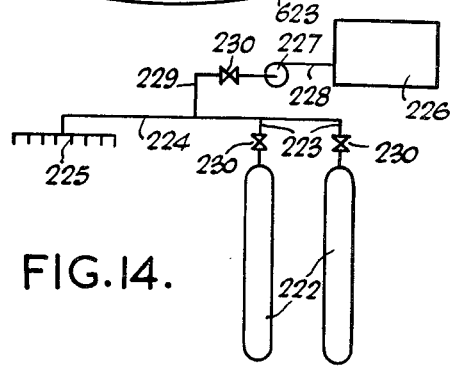
Figure 13:
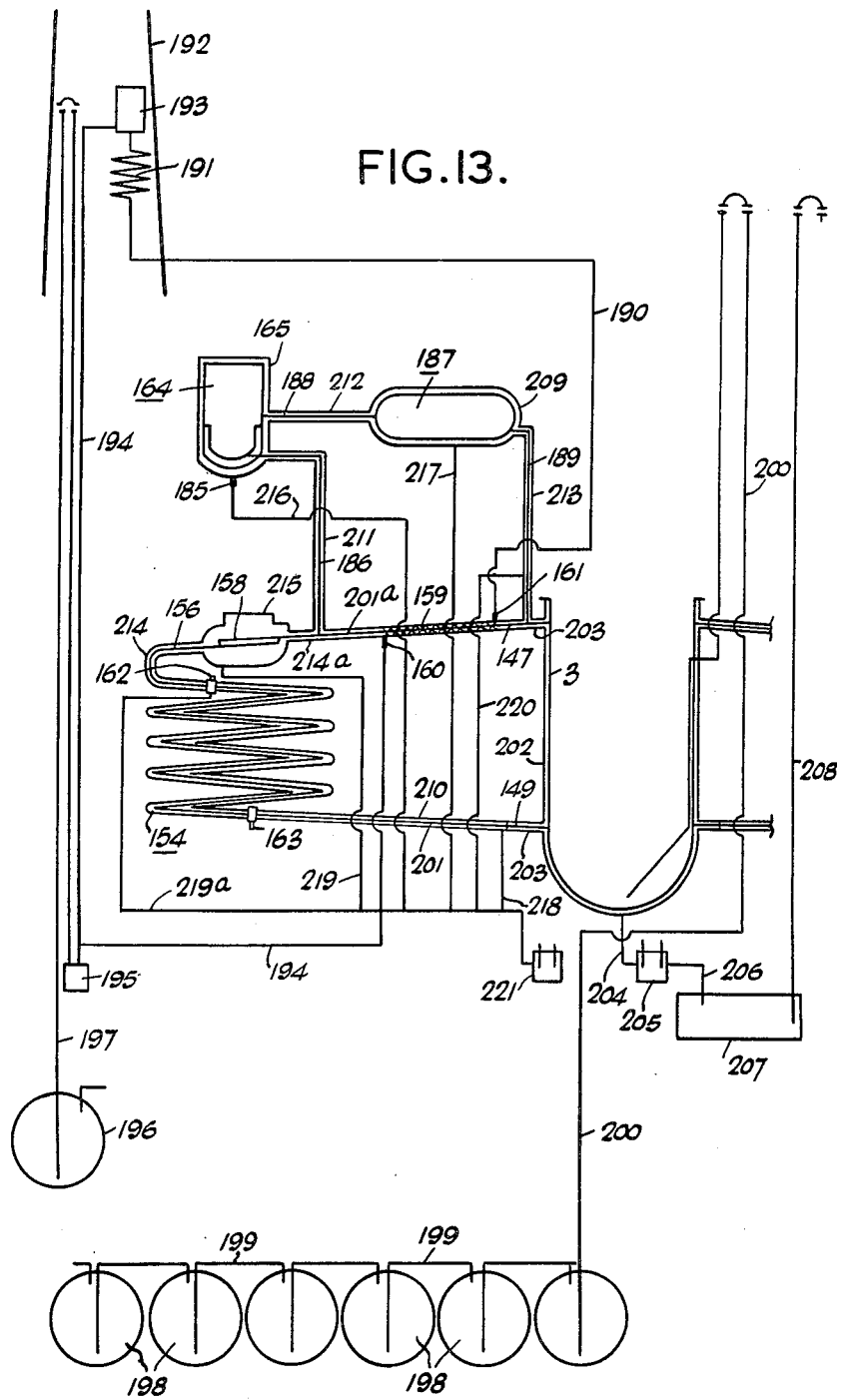
Figure 15:
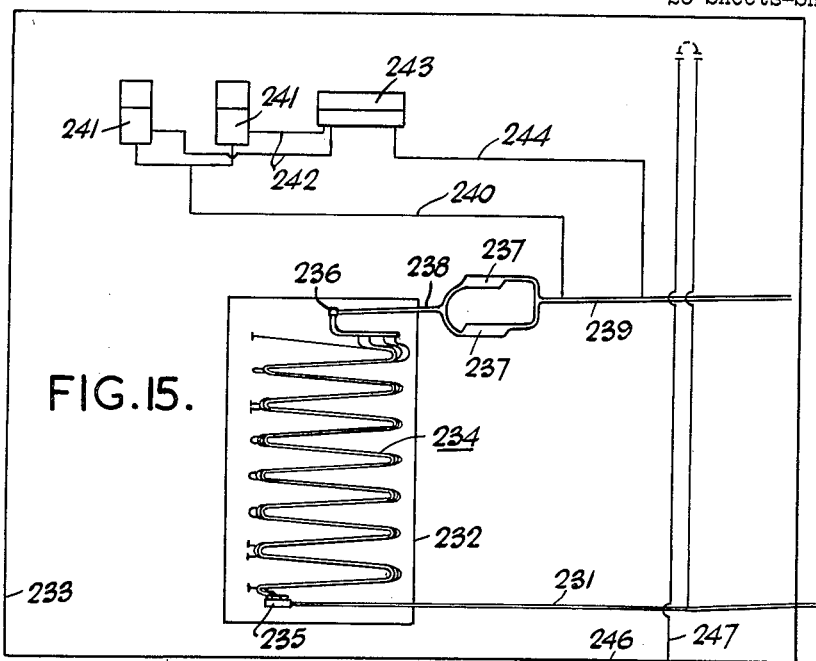
Figure 30B:
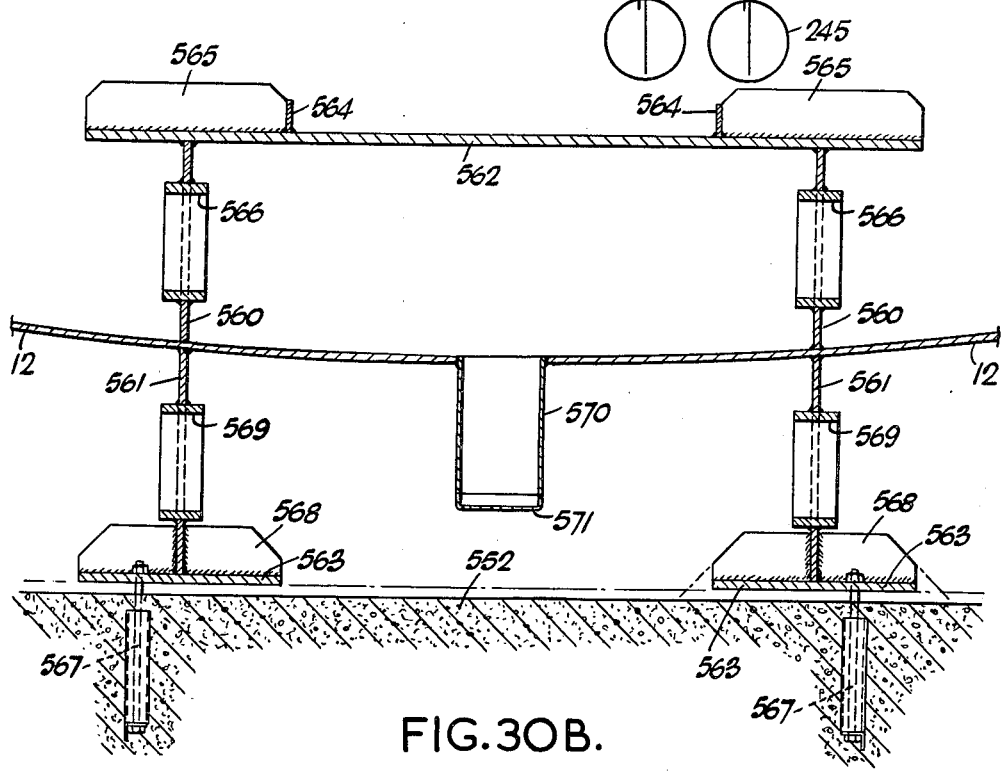
Figure 17:
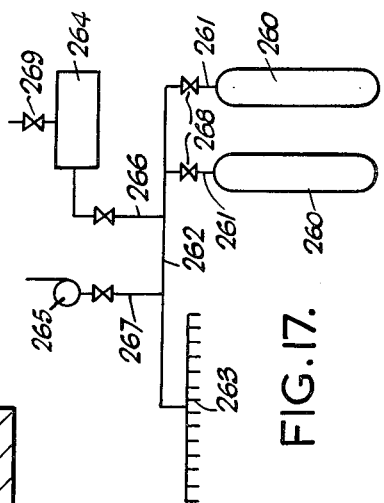
Figure 31:
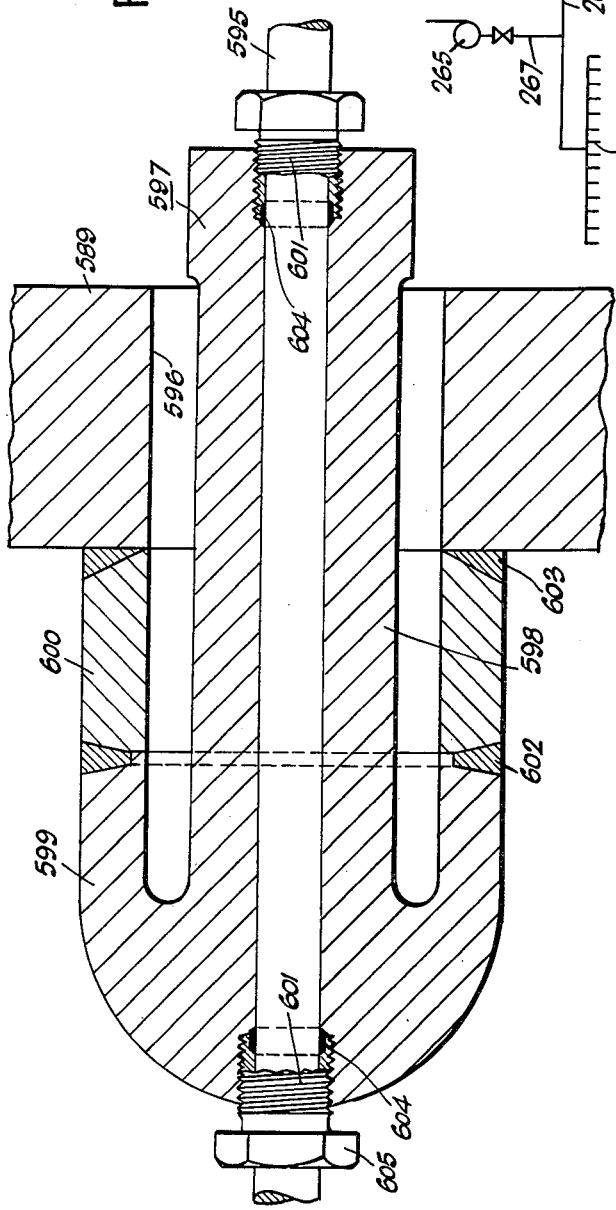
Figure 19:
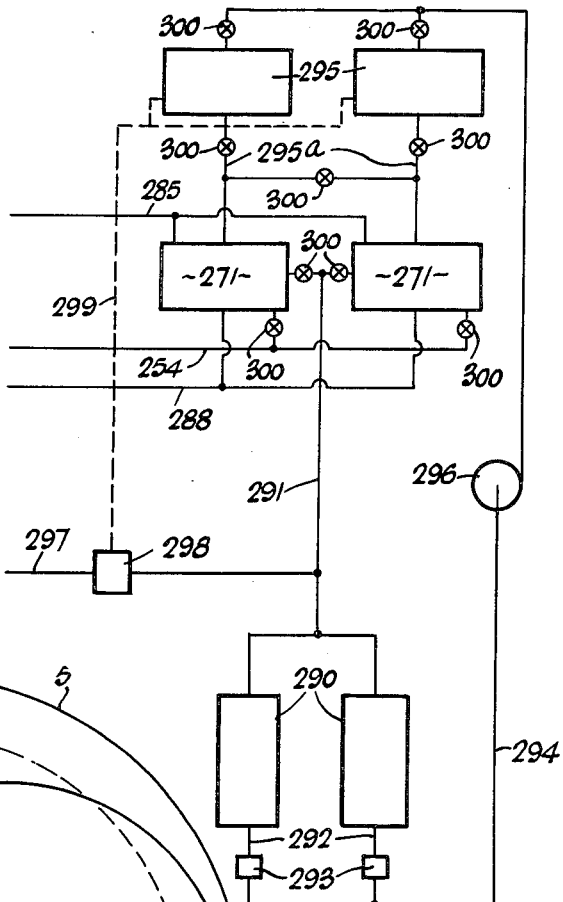
Figure 23B:
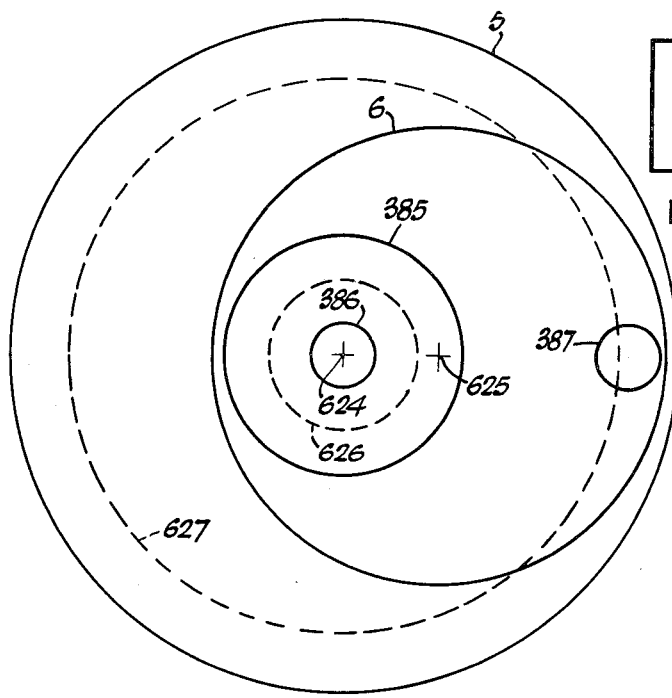
Figure 23:
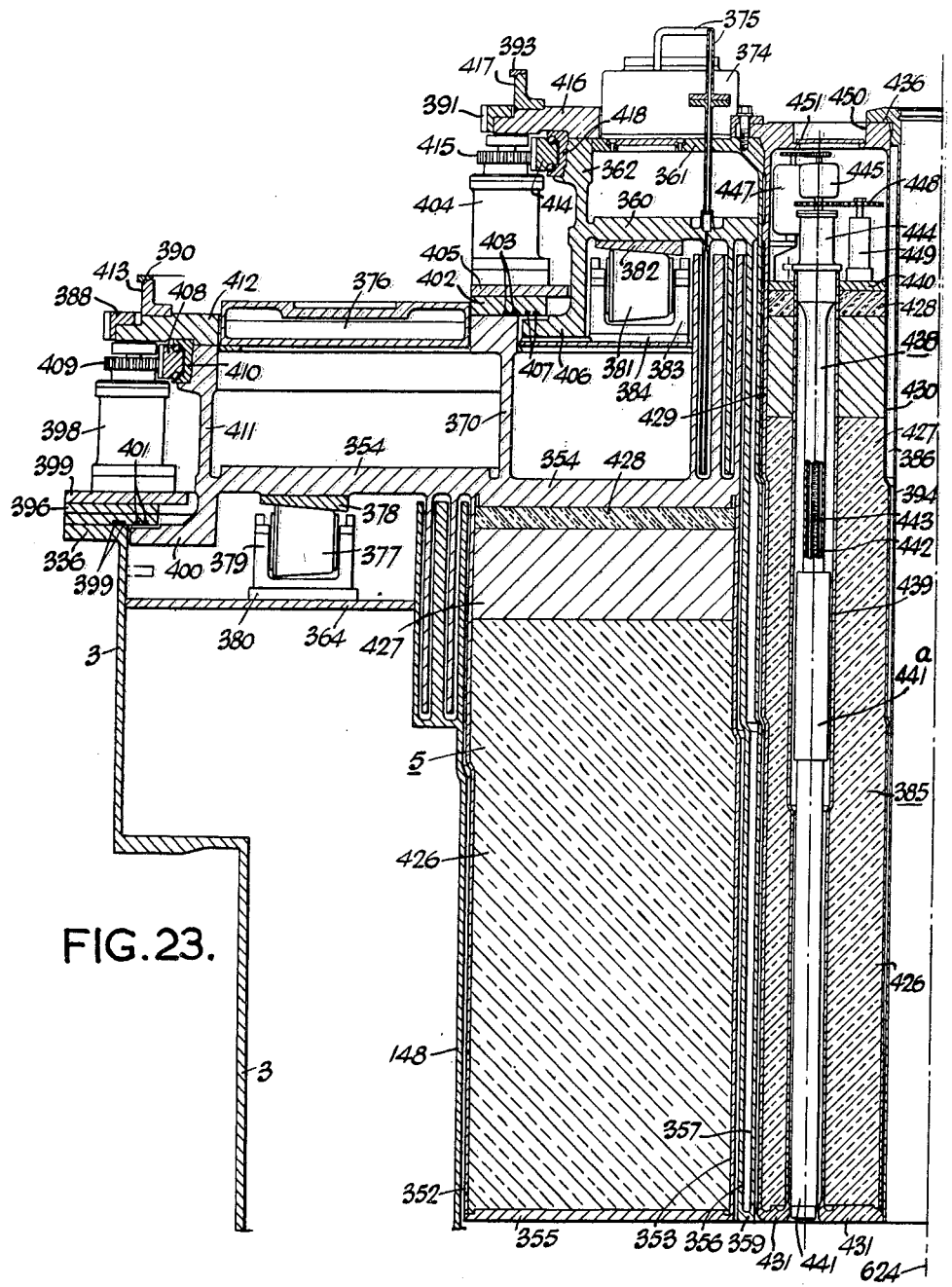
Figure 23A:
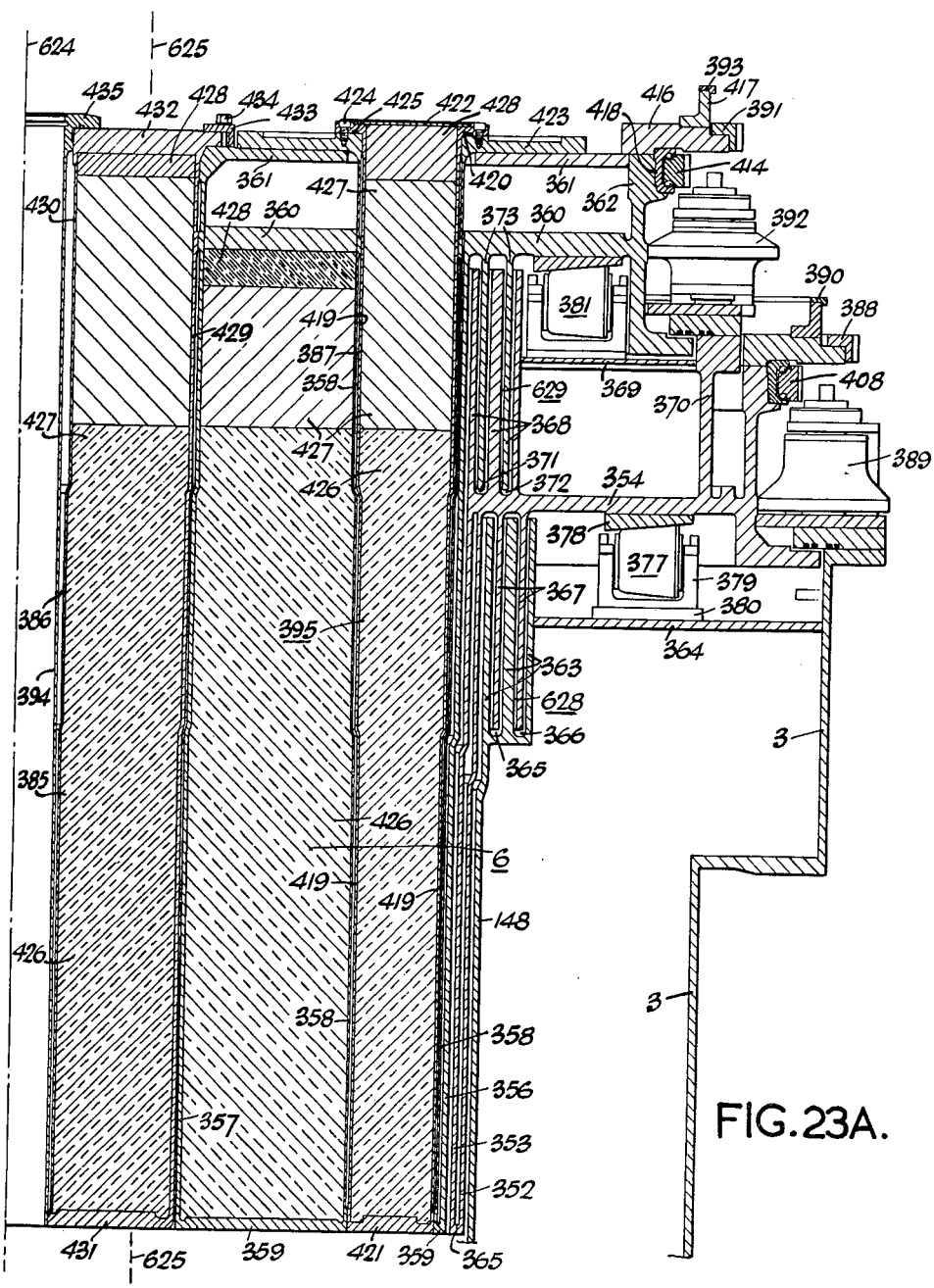
Figure 26:
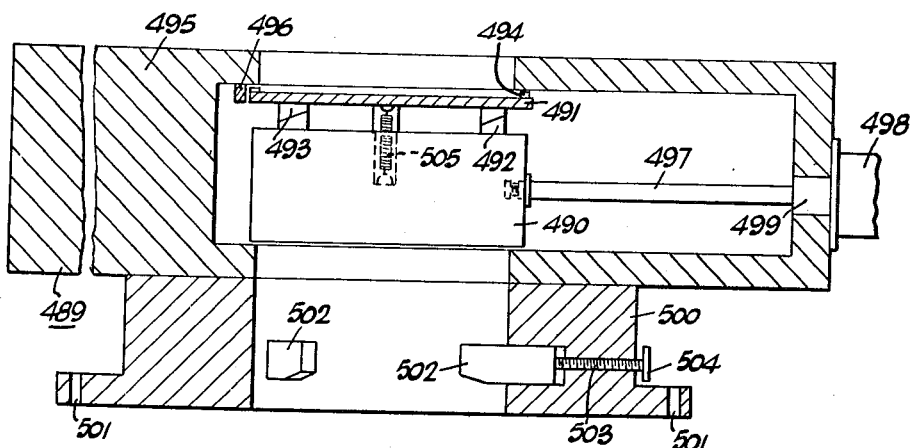
Figure 27:
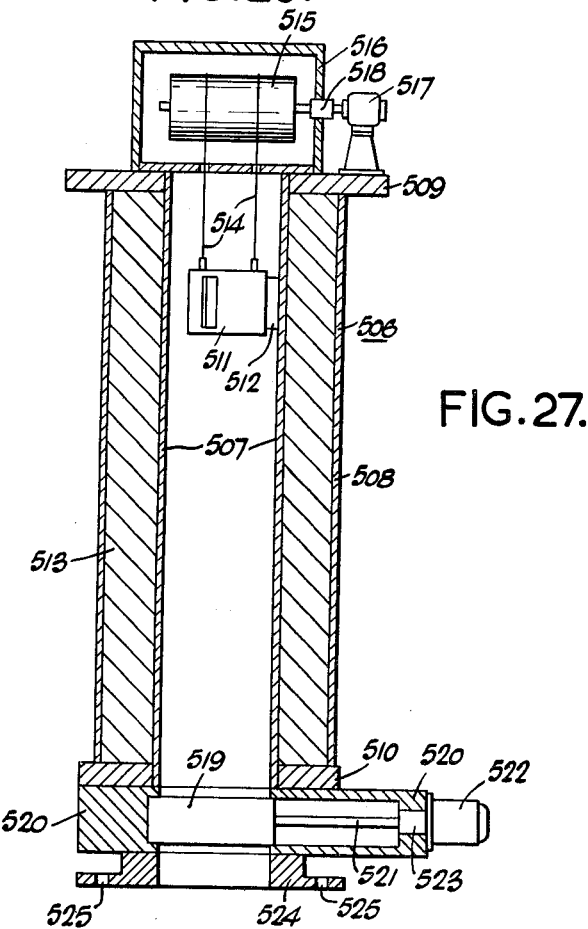
Figure 29:
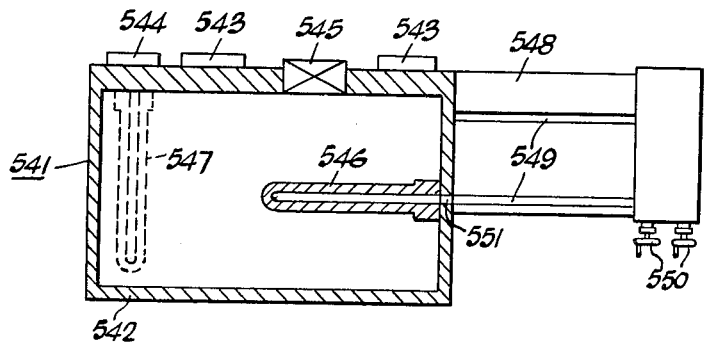
Figure 30C:
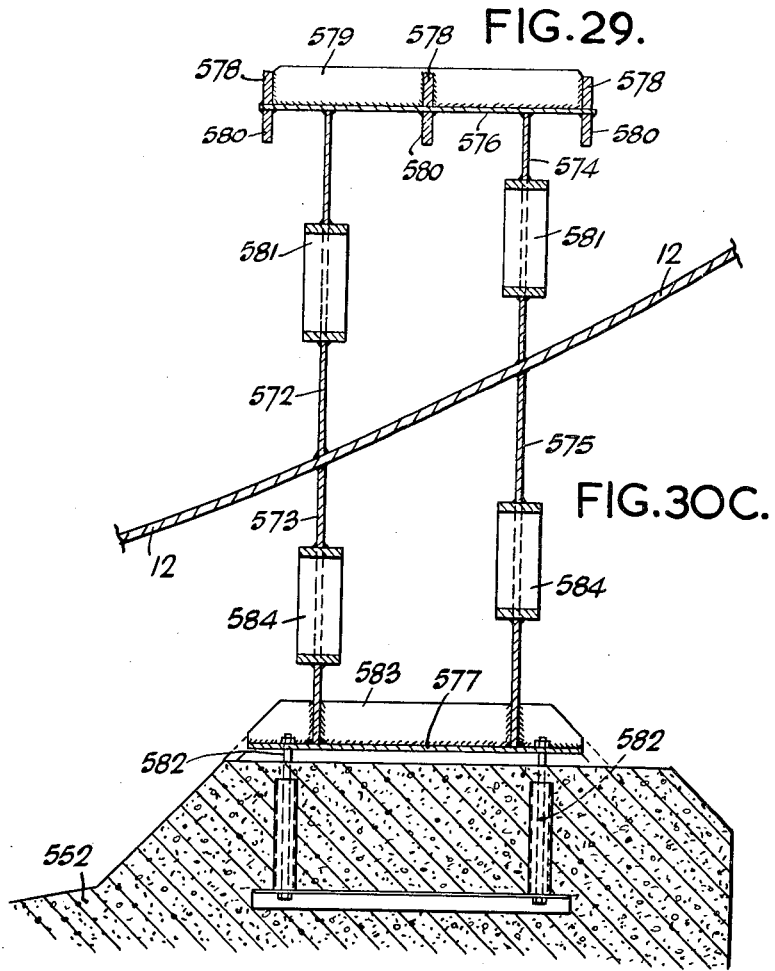
Figure 30D:
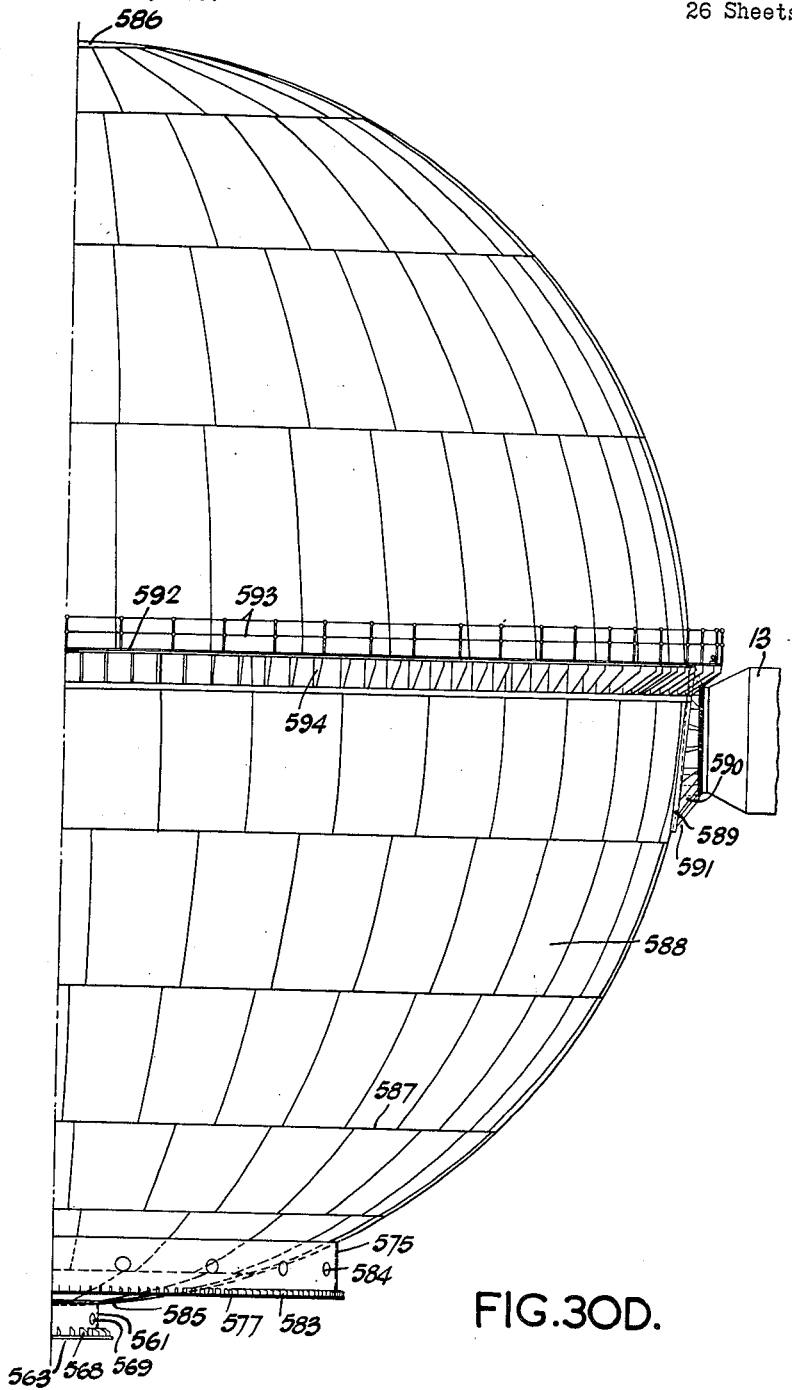

A fast reactor embodying the invention will now be described with reference to the accompanying drawings wherein:

FIG. 1 is a general arrangement;
FIGS. 2A, 2B and 2C show, in section, the consecutive portions of a fuel element: FIG. 2A being the top end, FIG. 2B the centre portion, and FIG. 2C the bottom end;
FIG. 3A is a plan view of the fuel element support plate,
FIG. 3B is an enlarged section along the line B—B in FIG. 3A;
FIG. 3C is a plan view of the fuel element locating plate, and
FIG. 3D is an enlarged section along the line D—D in FIG. 3C;
FIG. 4 is a plan section of the inner and outer core skirts;
FIG. 5A is an elevation of a control fuel element carrier frame,
FIG. 5B is an enlarged section along the line B—B in FIG. 5A,
FIG. 5C is an enlarged section along the line C—C in FIG. 5A, and
FIG. 5D is a reduced section along the line D—D in FIG. 5B;
FIG. 6 is a general arrangement of a control assembly drive mechanism;
FIG. 7 is a sectional elevation of a nut and screw mechanism for the control assembly drive mechanism of FIG. 6;
FIG. 8 is a sectional elevation of a breeder element;
FIG. 9 is a horizontal section through the core centre, showing half of the core, half of the blanket and half of the inner neutron shield;
FIG. 10 is a line diagram showing the core and blanket support structure within the reactor vessel;
FIG. 11A is a front elevation of a primary heat exchanger,
FIG. 11B is a side elevation of a primary heat exchanger, and
FIG. 11C is an enlarged section along the line C—C in FIG. 11A;
FIG. 12 is a semi-diagrammatic arrangement of a liquid metal cold trap;
FIG. 13 is a line diagram of a primary heat transfer circuit;
FIG. 14 is a line diagram of the primary nitrogen blanket system;
FIG. 15 is a line diagram of a secondary heat transfer circuit;
FIG. 16A is a side elevation of a secondary heat exchanger,
FIG. 16B is a side elevation of a secondary heat exchanger sub-unit, FIG. 16C is an elevation of a secondary heat exchanger bank, and FIG. 16D is an enlarged section along the line D—D in FIG. 16C;
FIG. 17 is a line diagram of the secondary nitrogen blanket system;
FIG. 18 is a general arrangement of a steam raising circuit;
FIG. 19 is a line diagram of the feed water system;
FIG. 20 is a diagrammatic arrangement of the biological shield cooling system;
FIG. 21 is a diagrammatic arrangement of the reactor vessel support cooling system;
FIG. 22 is a diagrammatic arrangement of the auxiliary instrument cooling system;
FIG. 23 is a sectional elevation of one half of the rotating shields and FIG. 23A is the other half; FIG. 23B is a diagrammatic plan view of the rotating shields;
FIG. 24 is a sectional elevation of a boron shut off rod;
FIG. 25A is a diagrammatic arrangement of the charging and discharging machine, FIG. 25B shows the engagement of the snout rod in FIG. 25A;
FIG. 26 is a sectional elevation of the adaptor used in conjunction with the charging and discharging machine;
FIG. 27 is a sectional elevation of a plug chamber;
FIG. 28 is a diagrammatic arrangement of the crane used in conjunction with the charging and discharging machine;
FIG. 29 is a diagrammatic arrangement of the storage building within the sphere;
FIG. 30A is a diagrammatic arrangement of the sphere support column and skirt, FIG. 30B is a sectional elevation of the sphere support column, FIG. 30C is a sectional elevation of part of the sphere support skirt, and FIG. 30D is an elevation of half of the sphere;
FIG. 31 is a sectional elevation of an electrical cable adaptor;

FIG. 32 is a sectional elevation of a pipe adaptor.

Referring to FIG. 1, a core 1 of fissile material is surrounded by a blanket 2 of uranium, the core 1 and the blanket 2 being contained in a reactor vessel 3 through which reactor coolant flows. Surrounding the reactor vessel 3 is an inner neutron shield 4. Situated above the reactor vessel 3 is a rotating shield 5 having a rotating shield 6 eccentrically mounted in it. Above the shield 6 is a charging and discharging machine 7 movable on a rotating crane 8. Disposed about the inner neutron shield 4 are heat exchanger assemblies 9 in a vault 10 formed by a concrete biological shield 11. Components numbered 1 to 11 are all enclosed by a sphere 12, access being provided by means of an air lock and bridge 13.

Components numbered 1 to 13 will now be described in greater detail under appropriate headings.

*The Core 1, Blanket 2, Reactor Vessel 3, and Inner Neutron Shield 4*

The core 1 of fissile material comprises uranium, enriched in U-235 to sixty times the concentration of U-235 in natural uranium, in the form of closely spaced vertically arranged fuel elements.

Each fuel element 14 (FIGS. 2A, 2B and 2C) comprises enriched uranium fuel 15 (FIG. 2B) of tubular form, an inner vanadium sheath 16 and an outer sheath 17 of niobium. The fuel 15 is contained between two molybdenum washers 18. Above and below the washers 18 there are breeder tubes 19 of natural uranium. A free space 20 (FIG. 2A) exists above the upper tube 19. The lower tube 19 rests on a natural uranium packing tube 21 (FIG. 2C). The packing tube 21 is supported on a niobium end plug 22 which is threaded into a stainless steel bottom end fitting 23. The niobium sheath 17 is argon arc welded to the plug 22 at the line 24. The vanadium sheath 16 rests on the end fitting 23. An annulus 25, duct 26 and pluggable holes 27 are provided for filling the element with liquid sodium metal to improve heat transfer from the fuel to sheaths 16 and 17. The end fitting 23 has a bore 28 equal to that of the sheath 16, a taper 29 and three symmetrically placed milled flats 30.

At the top end of the fuel element 14 there is a niobium end plug 31 (FIG. 2A) argon arc welded to the sheath 17 along the line 32. The plug 31 is screw fitted in a stainless steel top end fitting 33. An annulus 34, duct 35 and holes 36 are provided to allow for movement of the liquid sodium metal into and out from the element. Threaded holes 37 are provided in both end fittings 23 and 33 for a locking grub screw. The end fitting 33 is supported from a flanged end 38. Machined surfaces 39 locate the fuel element 14 and an undercut portion 39a provides means for inserting part of the machine 7 (FIG. 1) for charging and discharging the element. Four holes 40 (FIG. 2A) are provided for feeding reactor coolant to the outside of the element 14. Reactor coolant enters the top end fitting 33 at a mouth 41 and divides at the end of a bore 42 in the fitting 33: one part of the coolant issues through the holes 40 and cools the sheath 17 and the other part passes down the sheath 16.

The fuel element 14 is assembled by taking the outer sheath 17, spinning one end over to mate with the bottom plug 22 and then welding the sheath 17 to the plug 22 along the line 24. The outer sheath 17 is then filled with packing tube 21, breeder tubes 19, fuel tube 15 and molybdenum washers 18 in the correct order. The other end of the sheath 17 is spun over to mate with end plug 31 and then welded to that end plug along the line 32. The inner sheath 16 is fitted and the end fittings 23 and 33 screwed into place over the plugs 22 and 31 respectively. The element 14 is purged with argon, then evacuated and sodium metal is introduced at the holes 27 which are sealed off after the filling operation has been completed.

The fuel elements, being constructed in the manner described above, provide that should temperature conditions be such as to cause the inner sheath to fail, the fuel will be molten, and the molten fuel will discharge under gravitational forces along the inner wall of the outer sheath, thereby ensuring that the fuel leaves the core, thus avoiding the creation of super critical conditions.

Support for the core 1 comprises a star shaped perforated support plate 43 (FIGS. 3A and 3B) for the fuel elements 14, a star shaped perforated locating plate 44 (FIGS. 3C and 3D) for the fuel elements 14, an inner skirt 45 (FIG. 4) of star shaped section, an outer skirt 46 of hexagonal section arranged relative to the skirt 45 so that ridges 47 of the skirt 45 reach the skirt 46, division plates 48 from the skirt 46 to valleys 49 of the skirt 45 arranged so that the division plates 48 divide cavities between the skirt 45 and the skirt 46 into twelve similar triangular section parts 50, and twelve control assembly carrier frame 51 of triangular section for fuel elements 14 (FIGS. 2A, 2B and 2C) arranged so that the carrier frames 51 are movable into and out from the triangular section parts 50.

The carrier frames 51 are movable into and out from the parts 50 on six rollers 52 attached to the frames 51, the wall of the skirt 45, the division plates 48 and bearing inserts 53 and 54 providing bearing surfaces for the rollers 52.

The skirts 45 and 46 are joined by bolts 55 which screw into backing plates 56. The bolts 55 and backing plates 56 also secure the bearing inserts 53.

The division plates 48 are joined to the skirts 45 and 46 by bolts 57 which also secure the bearing inserts 54.

The fuel element support plate 43 (FIGS. 3A, 3B, and 10) and the fuel element locating plate 44 (FIGS. 3C, 3D, and 10) are located in the skirt 45, the plate 43 supporting the fuel elements from their top flanged ends 38 and the plate 44 locating the bottom end fittings 23 of the fuel elements.

Each carrier frame 51 (FIGS. 5A, 5B, 5C and 5D) comprises three plates 58 (FIG. 5B) joined together by screws 59 (FIG. 5A). The six rollers 52 (FIGS. 5B and 5C) are located in two planes (the plane of FIG. 5B and the plane of FIG. 5C) in holes 60 by screws 61, and the plates 58 have ribs 62 which serve to locate ten of the fuel elements 14 (FIGS. 2A, 2B and 2C). Two rollers 52 spaced apart from one another and in different planes are thus exposed on each face of the carrier frame 51. The fuel elements 14 are supported in a perforated block 63 (FIGS. 5B, 5C and 5D) joined to the plates 58 by screws 64 (FIG. 5A). A tapered section 65 has holes 66 allowing flow of coolant through the carrier frame 51. A snout shaped end piece 67 is welded to the tapered section 65 at the line 68.

The twelve control assembly carrier frames 51 each housing ten fuel elements 14 form twelve control assemblies. Control of the reactivity of the reactor core 1 is achieved by movement of the control assemblies into and out from the reactor core 1. Six of the control assemblies are normally only used for operational control, the other six being available for ultimate security. In emergency all twelve control assemblies can be dropped from the reactor core to ensure reactor shut off.

The twelve control assemblies are moved by twelve similar nut and screw drive mechanisms located in the reactor vessel 3.

Considering one nut and screw drive mechanism, a control assembly carrier arm 69 (FIG. 6) has a shaped end piece 70 adapted to hold the carrier frame end piece 67 and is connected to a tube 71. A connection arm 72 links the arm 69 to a structural tube 73, the arm 72 being free to move over the length of the tube 73.

The tube 71 is attached to a nut 74 (FIG. 7) by a tubular part 75. The nut 74 is associated with a screw 76 by a ball screw connection, the threads of the nut 74 and screw 76 forming a continuous spiral passage through which balls 77 circulate. The screw 76 is provided with a rotary head consisting of a collar 78 and ball races 79. A shaft 80 driven through a magnetic clutch 81 by a drive motor 107 is supported in a bearing 82. A magnet 83 is provided to hold the collar 78 and hence hold the screw 76 at one end of its travel, the ball race 79 permitting rotation in both directions once the nut 74 is away from its stop. The nut 74 is provided with a fixed head 84 which can also be held by the magnet 83.

The shaft 80 has splines 85 and the screw 76 has splines 86 so that when the shaft 80 rotates the screw 76 rotates but is free for axial movement. The nut 74 is prevented from rotating by its connection with the arm 72. The nut 74 has free axial movement together with the screw 76 it engages. Movement in the upward direction is limited by the magnet 83 and in the lower direction by stop 87.

The drive mechanism is supported in the structural tube 73 which dips into reactor coolant shown at the level 88. The drive mechanism has a liner tube 89 fitting in the tube 73 and the liner tube 89 has welded to it the stop 87, a sleeve 90 and a ring 91 of soft iron. The ring 91 also has welded to it a bearing support 103 and the support 103 is welded to a diaphragm 92 which is closed by a top plate 93 so that there is formed an annular well 94. Stacked rings of permanent magnets 95 are rotatable in the well 94. The magnets 95 are held in a frame 96 supported by bolts 97 from a head 98. The head 98 is carried on bearings 99 and is provided with an annular screw 100 for coupling with a worm drive 108 of the drive motor 107. The components numbered from 95 to 100 form one part of the magnetic clutch 81. The other part of the clutch 81 is inside the diaphragm 92 and consists of stacked rings of permanent magnets 101 mounted in a frame 102 keyed to the shaft 80 so that a drive to the shaft 80 is provided by magnetic coupling between magnets 95 and 101, the magnetic flux traversing the diaphragm 92.

The soft iron ring 91 has a web portion 104 which is split to provide four pole pieces. Over each of these pole pieces coils 105 are placed and surmounted by another soft iron ring 106. The components numbered 91 and 104 to 106 form the holding magnet 83.

Operation of the drive mechanism is now described, starting from an initial position in which the tube 71, arm 69 and carrier frame 51 housing ten fuel elements 14 are at the lowest position, that is the control assembly is withdrawn from the core and reactivity is low. In this position the nut 74 is at the stop 87. As the shaft 80 is rotated the screw 76 rotates and rises in the nut 74 which remains on the stop 87. Eventually the position is reached when the screw 76 is held via its collar 78 and the magnet 83. No further rotation of the shaft 80 can take place in the same direction as the nut 74 is against its stop 87, and slip is taken at the clutch 81. At this point the direction of rotation of the shaft 80 is reversed by reversing the drive motor 107 by manual control and as the screw 76 is held by the magnet 83 the nut 74 begins to rise up the screw 76 and inserts the control assembly into the core so that the reactivity of the reactor increases. Then the position is reached when the head 84 of the nut 74 is also held by the magnet 83, and the control assembly is fully inserted.

Operating control of the reactor is achieved by driving the nut 74 via the shaft 80 and screw 76 in either direction through the magnetic clutch 81. The screw 76 remains held at its upper level but transmits movement to the nut 74 by reason of its rotation on the rotary head and the couplings provided by balls 77. Emergency control is achieved at any position of the nut 74, and whilst a drive is or is not taking place, merely by de-energizing the magnet 83, when the collar 78 is released and the nut 74 and the screw 76 full under gravity to the stop 87. The control assembly is thus withdrawn from the core as the nut 74 and screw 76 fall, and the reactor shuts down.

The drive mechanism is designed to provide fine control for normal operation of the reactor and to provide rapid gravity operation in a direction that decreases the reactivity for emergency control of the reactor.

The twelve control assembly drive mechanisms are interlocked electrically so that only one control assembly can be raised i.e. moved into the reactor core at one time. Control motors linked to the drive motors 107 and provided with revolution counting position indicators are housed in a control room outside the reactor sphere.

Should a common fault develop in the twelve control assembly drive mechanisms thus preventing withdrawal of the control assemblies from the reactor core, six shut off rods 437 (FIG. 24) containing the boron isotope of mass number ten are provided which can be dropped by gravity into the blanket 2 (FIG. 1) (as will later be described in more detail).

The blanket 2 (FIG. 1) comprises breeder elements of uranium vertically arranged about the core 1.

Each breeder element 109 (FIG. 8) comprises cylindrical rods 110 of uranium, a stainless steel outer sheath 111, stainless steel plugs 112 and 113 and stainless steel end fittings 114 and 115.

The sheath 111 is welded to the plugs, 112 and 113 at the lines 116 and 117 respectively. The plug 113 is screw fitted to the end fitting 115 which has three equally spaced flutes 118. A plate for locating the bottom end of each element 109 is shown by the dotted lines 119 and holes 120 in the plate 119 are indicated.

A space 121 between the rods 110 and the plug 112 is filled with inert gas. The plug 112 is screw fitted to the end fitting 114 which has six equispaced holes 122. An undercut portion 123 provides means for inserting part of the machine 7 (FIG. 1) for charging and discharging the elements 109. A plate for locating the top end of each element 109 is shown by the dotted lines 124 and holes 125 in the plate 124 are indicated. The elements 109 are supported on a plate shown by the dotted lines 126.

Reactor coolant enters the end fitting 114 at a mouth 127 and issues through the holes 122 and cools the sheath 111. At the bottom end of the element 109 the coolant passes through the flutes 118. Varying flow rate of coolant to different sections of the blanket 2 is effected by having zones of holes 128 of different sizes in the plate 126.

The broader elements 109 are contained in an outer skirt 129 (FIG. 9) of circular cross section and the blanket 2 is divided into an inner section 130 and an outer section 131 by a skirt 132 of hexagonal cross section.

The core 1 and the blanket 2 are contained in the reactor vessel 3 which is surrounded by the inner neutron shield 4, a space 133 being provided between the reactor vessel 3 and the inner neutron shield 4 for a layer of thermal lagging 134 and an inner ring of twenty-four reactor vessel support columns 135.

The inner neutron shield 4 is supported in the reactor vault 10 (FIG. 1) and is built up from bricks of borated graphite and pure graphite, forming a layer of pure graphite 136 (FIG. 9) at the level of the enriched uranium in the core 1 enclosed by borated graphite 137. The borated graphite 137 contains approximately 5% of boron which is sufficient to absorb neutrons which have been slowed down in the shield 4 and the pure graphite layer 136 provides a region in which neutron intensity measurements can be taken, measuring instruments being located in twelve equispaced instrument tubes 138 arranged vertically in the inner neutron shield 4. The measuring instruments are linked to neutron flux recorders in the control room outside the reactor sphere. A stainless steel sheathed radium beryllium neutron source is located in the inner section of the blanket to provide background radiation for the measuring instruments during reactor start up. The neutron source is transferred to the inner rotating shield 6 (FIG. 1) during normal reactor operation.

Each instrument tube 138 (FIG. 9) houses an ionisation chamber 139, a tubular sheath 140 of lead, and a sheath 141 of thermal insulating material. An inlet passage 142 and an outlet passage 143 are provided for cooling purposes.

A layer of thermal lagging 144 surrounds the shield 4 and a space 145 is provided for an outer ring of twenty-four inner neutron shield support columns 146.

The core inner skirt 45, the core outer skirt 46, fuel elements 14, and the control assembly structural tubes 73, together with the position occupied by two of the control assembly carrier arms 69, are also shown on FIG. 9.

The reactor vessel 3 (FIG. 10) also contains reactor coolant, the coolant entering the vessel 3 from twenty-four equispaced inlet pipes 147. The coolant is fed through the wall of a cylindrical support vessel 148 and then flows downwardly through the core and the blanket before leaving the reactor vessel 3 through twenty-four equispaced outlet pipes 149. Its passage through the core is defined by the outer skirt 46 and its passage through the blanket is defined by the skirts 46, 129.

The vessel 148 is supported from the wall of the reactor vessel 3 by an annular plate 150. The blanket outer skirt 129 is supported from the vessel 148 and the core outer skirt 46 is supported on a support box 151 attached to the bottom end of the skirt 129. The support box 151 also serves to support the breeder element support plate 126 and the breeder element inner skirt 132. The breader element locating plates 119 and 124 are located in the skirt 129. The control assembly drive mechanism structural tubes 73 are supported from the reactor vessel 3 by an annular plate 364, the plate 150 and an annular plate 152. The vessel 148 has three vertical flanges 363, the plate 364 being welded to the outer flange 363. Pipes 153 house thermocouple cables, from which thermocouples measure the temperature in the region of the reactor core and blanket. The thermocouples are linked to temperature recorders in the control room outside the reactor sphere. Four of the outlet pipes 149, carrying all the blanket coolant are connected by pipes 620 to the support box 151, the other twenty outlet pipes 149 being open to the reactor vessel to carry all the core coolant, the aggregate of blanket and core coolant making up the reactor coolant. A catchpot 621 supported on a ring plate 622 having support legs 623 is provided to disperse molten uranium should the fuel elements melt. One of the control assembly carrier arms 69, one of the tubes 71 and one of the connecting arms 72 are also shown in FIG. 10.

The Heat Exchanger Assemblies 9

The heat exchanger assemblies 9 comprise a primary heat transfer system and a secondary heat transfer system. The primary heat transfer system comprises twenty-four similar primary heat transfer circuits radially disposed outside the inner neutron shield. In the primary heat transfer circuits, heat in the reactor coolant is transferred to an intermediate liquid metal coolant. Twenty of the primary heat transfer circuits accept reactor coolant and four accept blanket coolant as mentioned above.

Considering one primary heat transfer circuit, liquid sodium metal reactor coolant flows through a pipe 201 (FIG. 11A) from one of the reactor vessel outlet pipes, and passes through the inner neutron shield to the bottom of a primary heat exchanger 154 (FIGS. 11A and 11B) situated in the reactor vault and supported from the biological shield by a support plate 155. The primary heat exchanger 154 comprises an inner tube 156 (FIG. 11C) and an outer tube 157 co-axial with the tube 156. The reactor coolant flows through the tube 156 and heat is transferred to the intermediate coolant flowing counter current through the annular space between the tubes 156 and 157. The intermediate coolant enters at inlet 162 and emerges at outlet 163. After passing through the heat exchanger 154 (FIG. 11A) the reactor coolant enters a flat induction type electromagnetic pump 158 which returns the reactor coolant to the reactor vessel through a pipe 201a to one of the reactor vessel inlet pipes. The coolant flow through the pump 158 is controlled from the control room outside the reactor sphere. A thermal syphon heat exchanger tube 159 having an inlet 160 and an outlet 161 is also shown in FIG. 11A.

Approximately 2½% of the reactor coolant flow from the pump 158 is bypassed into a cold trap 164 (FIG. 12). The cold trap 164 is included to effect continuous removal of any sodium oxide formed in the reactor coolant, since the presence of oxide greatly increases the rate of corrosion of structural materials. The solubility of sodium oxide in the coolant increases with temperature, hence lowering the coolant temperature in the trap 164 causes some of the oxide to be precipitated.

The trap 164 comprises an outer cylindrical vessel 165 surrounded by a cooling jacket 166, an inner cylindrical vessel 167, a sealing plug 168, a central tube 169, a tubular vessel 170 having a dome shaped end piece 171, thermal lagging 172, and filter rings 173 supported by the lagging 172 and the vessel 170. The cooling jacket 166 has an inlet 174 for cold air, an outlet 175 for hot air, cooling fins 176 and a cylindrical baffle plate 177. The vessel 167 has a reactor coolant inlet pipe 178 and outlet pipe 179. The central tube 169 and the vessel 170 form an annular channel 180, and the vessel 170 and the lagging 172 form an annular channel 181. An outlet 185 to the vessel 165 is also shown in FIG. 12.

Reactor coolant enters the cold trap 164 at the inlet 178, flows thorugh the central tube 169 and most of the coolant then flows into the space above the lagging 172, the rest of the coolant being directed into the channel 180 by the end piece 171. After flowing through the channel 180 as shown by arrows 182 the reactor coolant flows, as shown by arrows 183, through the space between the vessel 167 and the vessel 170, where it is cooled by the counter current of cold air flowing from the inlet 174 over the cooling fins 176, the air being then directed to the outlet 175 by the plate 177. The coolant after being cooled flows over the packed filter rings 173 where precipitated sodium oxide is deposited. The coolant then flows through the channel 181 as shown by arrows 184 and mixes with the rest of the reactor coolant in the space above the lagging 172 before flowing out through the outlet pipe 179. The cold trap is designed so that the overall drop in temperature between the inlet 178 and outlet 179 is not sufficient to seriously affect the efficiency of the primary heat transfer circuit.

The reactor coolant is fed to the cold trap 164 (FIG. 13) via a pipe 186 and from the cold trap 164 is fed into an expansion tank 187 via a pipe 188, and from the tank 187 back into the reactor vessel inlet pipe 147 via a pipe 189.

The expansion tank 187 provides a reserve volume into which the reactor coolant can expand due to temperature and other changes.

Should total reactor coolant pump failure occur, a thermal syphon heat exchange system is provided for the rejection of heat generated in the core due to fission product decay after the reactor has been shut down.

The thermal syphon heat exchange system comprises four similar circuits, each circuit having six primary syphon heat exchangers. One such primary syphon heat exchanger comprises the tube 159 (FIG. 11A) co-axial with and surrounding part of one of the pipes 201a and the inlet pipe 160 and the outlet pipe 161.

The heat transfer medium in the thermal syphon heat exchange system is liquid sodium potassium eutectic alloy.

The outlet pipes 161 of the six primary syphon heat exchangers in one thermal syphon circuit are connected to a common pipe 190 (FIG. 13) through which coolant flows to a finned tube air cooled heat exchanger 191 situated in a chimney 192 outside the reactor sphere. Coolant passing through the heat exchanger 191 rejects heat to air and then flows to a combined cold trap and expansion tank 193. The tank 193 serves the same purposes as the cold trap 164 and the expansion tank 187. From the tank 193 the coolant returns to the inlet pipes 160 via a common pipe 194, a vessel 195 being provided for the collection of any solid waste material. A thermal syphon coolant charge tank 196 located outside the reactor sphere is provided with pipes 197 for charging the thermal syphon system with coolant. The pipes 197 may be sealed from the thermal syphon system during the filling of the charge tank 196.

Coolant flow is due solely to a thermal syphon action. Since this thermal syphon action takes place when the reactor is running there is normally a continuous heat loss from the reactor coolant to air.

Reactor coolant charge tanks 198 situated outside the reactor sphere are interconnected by pipes 199 and are provided with pipes 200 for charging the reactor coolant side of the primary heat transfer system. The pipes 200 may be sealed from the primary system during the filling of the charge tanks 198.

A coolant leak detection system is provided for the whole of the primary heat transfer system.

The leak detection system is in two sections, one section for the reactor vessel 3, the reactor vessel inlet pipes 147 and the reactor vessel outlet pipes 149, the other section for the pumps 158, the cold traps 164, the expansion tanks 187, the pipes 186, 188, 189, 201, 201a, and the length of pipe 156 between the heat exchangers 154 and the electromagnetic pumps 158.

The leak detection system comprises probe type leak detectors connected to outer leak jackets on all parts of the primary heat transfer system except the actual heat transfer sections of the primary heat exchangers 154. Any leakage of liquid metal into the leak detectors completes an electrical circuit which operates an alarm in the control room outside the reactor sphere.

Thus the reactor vessel 3 has a leak jacket 202 and the inlet and outlet pipes 147 and 149 have leak jackets 203, the jackets 202 and 203 being connected by a pipe 204 to a leak detector 205. The leak detector 205 is connected by a pipe 206 to a buffer tank 207 provided with a nitrogen feed pipe 208.

Similarly the expansion tanks 187 have leak jackets 209, the pipes 201, 186, 188, 189, 156, 201a have leak jackets 210, 211, 212, 213, 214, 214a respectively, the pumps 158 have leak jackets 215 and the cold trap outer vessel 165 serves as a leak jacket. The cold trap outlet 185 and the leak jackets 209 with 212, 210, 211 with 214a and 215, 214, 213 are connected by pipes 216, 217, 218, 219, 219a, 220 respectively to a leak detector 221.

All free liquid metal surfaces in the primary heat transfer system are covered with nitrogen from a primary nitrogen blanket system. The nitrogen minimises atmospheric oxygen contamination of the liquid metal and is used as a control pressure for the primary heat transfer system. During normal operation the nitrogen pressure is approximately 50 p.s.i.g.

The primary nitrogen blanket system comprises nitrogen cylinders 222 (FIG. 14) connected by pipes 223 to a main nitrogen feed pipe 224 from which nitrogen is fed from outlets 225 to all free liquid metal surfaces in the primary heat transfer system, a buffer tank 226 and a compressor 227 connected by a pipe 228, the compressor 227 being connected to the main pipe 224 by a pipe 229, and valves 230.

The compressor 227 is normally used when the reactor has been shut down to reduce the pressure in the primary nitrogen blanket system by compressing the nitrogen above the free liquid metal surfaces into the buffer tank 226 which is situated in the reactor vault. The valves 230 are used for control purposes and also indicate the nitrogen pressure in the system.

The secondary heat transfer system comprises twelve similar secondary heat transfer circuits in which heat is transferred from the intermediate coolant coming from the primary heat transfer system to water and steam in a steam raising system.

Considering one secondary heat transfer circuit, intermediate liquid sodium metal coolant leaving two of the intermediate coolant outlets 163 (FIG. 11A) flows in a double walled pipe 231 (FIG. 15) through the biological shield and reactor sphere into a heat exchanger cubicle 232 located in a secondary heat exchanger house 233. The heat exchanger cubicle 232 houses a secondary heat exchanger 234 and the intermediate coolant enters the bottom of the secondary heat exchanger 234 via a header tube 235. After passing through the heat exchanger 234 in which heat is transferred to water and steam the intermediate coolant then flows into a header tube 236 and thence to two electromagnetic pumps 237 in parallel via a pipe 238. Two pumps 237 are provided as the intermediate coolant flow through one secondary heat exchanger is normally twice the flow through one of the primary heat exchangers, each secondary heat transfer circuit receiving heat from two primary heat exchangers. Coolant flow through the pumps 237 is controlled from the control room outside the reactor sphere. The pumps 237 deliver the intermediate coolant to a double walled pipe 239 and part of the coolant flow is directed through a pipe 240 to two cold traps 241 in parallel. The cold traps 241 serve the same purpose as the cold traps in the primary heat transfer circuits and are similar in design and work on the same principle. From the cold traps 241 the intermediate coolant flows in pipes 242 to an expansion tank 243 which acts as a reserve volume into which the intermediate coolant can expand due to temperature and other changes. From the tank 243 the intermediate coolant flows in a pipe 244 and joins the main flow in the double walled pipe 239 which passes through the heat exchanger house 233, the reactor sphere and the biological shield and is connected to two of the intermediate coolant inlets 162 (FIG. 11A).

Secondary circuit charge tanks 245 located outside the reactor sphere are interconnected by a pipe 246 and are provided with pipes 247 for charging the secondary heat transfer system with liquid sodium metal. The pipes 247 may be sealed from the secondary heat transfer circuit during the filling of the charge tanks 245.

Each secondary heat exchanger 234 comprises seven sub-units 248 (FIG. 16A) each sub-unit 248 comprising three heat exchanger banks 249 (FIG. 16B) of heat exchanger sections 250 (FIG. 16C). Thirteen heat exchanger sections 250 connected in series form one heat exchanger bank 249. Each heat exchanger section 250 comprises a central stainless steel tube 251 (FIG. 16D) and four outer stainless steel tubes 252 bonded in a block 253 of copper plates. The intermediate coolant flows upwardly through the four outer tubes 252 and water or steam flows counter current in the central tube 251.

On the water or steam side of each heat exchanger bank 249, the top three heat exchanger sections 250 (FIG. 16C) form a preheater section having an inlet 254 and an outlet 255. The next eight heat exchanger sections 250 an evaporator section having an inlet 256 and an outlet 257, and the bottom two heat exchanger sections 250 form a superheater section having an inlet 258 and an outlet 259.

The header tubes 235 and 236 are also shown in FIGS. 16A, 16B and 16C.

All free liquid metal surfaces in the secondary heat transfer system are covered with nitrogen from a secondary nitrogen blanket system. The nitrogen minimises atmospheric oxygen contamination of the liquid metal and is used as a control pressure for the secondary heat transfer system. During normal operation the nitrogen pressure is approximately 55 p.s.i.g. i.e. slightly higher than the primary nitrogen blanket pressure. This is to ensure that reactor coolant does not enter the secondary heat transfer system in the event of a leak between the primary and secondary heat transfer systems.

The secondary nitrogen blanket system comprises twelve similar secondary nitrogen blanket circuits, each circuit serving one of the twelve secondary heat transfer circuits.

Each secondary nitrogen blanket comprises nitrogen cylinders 260 (FIG. 17) connected by pipes 261 to a main nitrogen feed pipe 262 from which nitrogen is fed from outlets 263 to all free liquid metal surfaces in one of the secondary heat transfer circuits, a buffer tank 264, a compressor 265, the buffer tank 264 being connected to the main pipe 262 by a pipe 266, the compressor 265 being connected to the main pipe 262 by a pipe 267, valves 268, and an automatic pressure release valve 269 fitted to the buffer tank 264.

The compressor 265 is used to discharge the nitrogen above the free liquid metal surfaces in one of the secondary heat transfer circuits and the buffer tank 264 serves to reduce pressure variations in the secondary nitrogen blanket circuit. The automatic pressure release valve 269 fitted to the buffer tank 264 reduces pressure in the secondary nitrogen blanket circuit should the primary nitrogen blanket pressure fall. The valves 268 are used for control purposes and also indicate the nitrogen pressure in the circuit.

The heat transferred to water and steam in the secondary heat transfer system is used to generate electricity in conventional plant.

Referring to the steam raising system in more detail, there are twelve steam raising circuits each having a feed pump 270 (FIG. 18) which draws water from feed tanks 271 via an inlet pipe 272 and delivers the water to one of the secondary heat exchanger preheater section inlets 254 via a pipe 273. After passing through the preheater section, in which the water is heated, the water is fed from the outlet 255 to the water storage space of a steam drum 274 via a pipe 275. A circulating pump 276 draws the heated water from the drum 274 via a pipe 277 and delivers the heated water to the secondary heat exchanger evaporator section inlet 256. After passing through the evaporator section in which steam is raised, the steam is fed from the outlet 257 to the steam storage space of the drum 274 via a pipe 278. The steam is then taken via a pipe 279 to the secondary heat exchanger superheater section inlet 258. After passing through the superheater, the superheated steam is fed from the outlet 259 into a pipe 280 and then taken via a pipe 281 to a turbine 282 common to the twelve steam raising circuits where the superheated steam is used to generate electricity. The turbine discharges to a water-cooled surface condenser 283 via a pipe 284. The condensate is recirculated via a pipe 285 connecting to the feed tanks 271.

Residual heat due to fission product decay after reactor and turbine shut down is rejected to water in a water cooled heat exchanger 286 connected to the pipe 280 by a pipe 287. Condensate from the heat exchanger 286 is recirculated via a pipe 288 connecting to the feed tanks 271. If necessary all the heat may be rejected in this manner, valves 289 being provided.

One of the secondary heat exchanger cubicles 232, one of the secondary heat exchangers 234, two of the electromagnetic pumps 237 and the pipes 231 and 237 are also shown in FIG. 18.

The condensate recirculating pipes 285, 288 deliver condensate to the two feed tanks 271 (FIG. 19) from which two deaerators 290 in parallel draw water by gravity flow via a pipe 291. The deaerators 290 are connected by pipes 292 to coolers 293. The coolers 293 are connected to a pipe 294 which delivers hot deaerated water to two reserve tanks 295 by means of a pump 296.

The reserve tanks 295 are connected by inter-connected pipes 295a to the feed tanks 271 from which the hot deaerated water flows through the steam raising circuit inlet pipe 254.

Any necessary deionized water required to make up the desired flow rate is fed directly into the pipe 291 from an inlet pipe 297. The inlet pipe 297 is fitted with a flow controller 298 actuated (as indicated by the dotted lines 299) by the water level in the reserve tanks 295. Control valves 300 are also provided.

Hot water is fed to the steam raising circuits to reduce the danger of freezing the intermediate liquid metal coolant in the preheater sections of the secondary heat exchangers.

*The Vault 10 and the Biological Shield 11*

The biological shield provides protection against radiation from the reactor core, blanket and primary heat transfer system.

The biological shield also forms a floor 301 (FIG. 20), a wall 302 and a roof 303, of the reactor vault 10. The roof 303 is supported from the floor 301 by a ring of twelve vertically arranged support columns 304. The primary heat transfer system cold traps 164 are located in the roof 303 and ducts 305 are provided in the roof 303 for the primary heat transfer system electromagnetic pumps. A layer of thermal lagging 306 is provided for the vault 10 and the support columns 304.

Located in the wall 302 are liner tubes 307 and 308 through which the secondary coolant inlet and outlet pipes respectively pass.

A biological shield cooling system is provided to cool the inner surfaces of the vault floor 301, wall 302 and roof 303, the cold traps 164, the walls of the ducts 305, the support columns 304 and the liner tubes 307 and 308.

The biological shield cooling system comprises twelve air circulating fans 309 mounted on a fan gallery 310 outside the vault wall 302. The fans 309 deliver cold air into a cold air ring main 311 running round the outside of the vault 10 below the fan gallery 310. The main vault cooling air is fed from the cold air ring main 311 into the vault 10 in twelve ducts 312 equispaced around the wall 302 below the cold air ring main 311. All this air is fed to the centre of the floor 301 and it then passes radially outward and up the wall 302 in a space 313 between the thermal lagging 306 and the vault floor 301, wall 302 and roof 303. Some of the air passes upwardly over the outside of the roof support columns 304 in a space 314 between the lagging 306 and the columns 304, re-entering the main air flow at the vault roof 303. After cooling the inner surfaces of the vault floor 301, the wall 302, the roof 303 and the support columns 304, the hot air is directed radially outward by an annular baffle plate 315 to twelve equispaced ducts 316 passing through the wall 302 to a hot air ring main 317 running round the outside of the vault 10 and supported on a platform 318 above the fan gallery 310. From the hot air ring main 317 the hot air is fed via twelve pipes 319 into twelve oil cooled heat exchangers 320 associated with the fans 309. The cooled air is then recirculated by the fans 309.

The fans 309 are connected in parallel and each fan is fitted with a shutter to prevent air being bypassed if any of the fans are not in operation.

The oil in the heat exchangers 320 is cooled by circulation by a pump through water cooled heat exchangers, the pump and the heat exchanger being located in the secondary heat transfer system heat exchanger house.

Air is also fed from the cold air ring main 311 to the cold traps 164, the ducts 305 and the liner tubes 307 and 308.

Cold air is fed from the ring main 311 to the cold traps 164 and ducts 305 in twelve pipes 321 up the outside of the vault wall 302 to the vault roof 303, each pipe 321 delivering air to one cold trap 164 and one duct 305. After passing over the cold trap 164 and wall of the duct 305 the hot air passes into the main air stream beneath the vault roof and out into the hot air ring main 317 via the ducts 316.

Cold air is fed from the ring main 311 to the liner tubes 307 in pipes 322. The pipes 322 connect to a header tube 323 adjacent to the liner tubes 307. After cooling the liner tubes 307, the air passes into the main air stream inside the vault wall 302. Similarly cold air is fed from the ring main 311 to the liner tubes 308 in pipes 324. The pipes 324 connect to a header tube 325 adjacent to the liner tubes 308. After cooling the liner tubes 308, the air passes into the main air stream inside the vault floor 301.

The inner ring of reactor vessel support columns 135 (FIG. 21) and the outer ring of inner neutron shield support columns 146 are located in the reactor vault 10. The support columns 135 and 146 are hollow and to prevent overheating of these columns, a cooling system is provided.

The cooling system comprises twelve nitrogen circulating fans 326 arranged in pairs around the fan gallery 310. Each pair of fans 326 delivers nitrogen through equispaced ducts 327 in the vault wall 302 to a cold nitrogen ring main 328 located on the vault floor 301. From the ring main 328 nitrogen is fed in pipes 329 to the bottom of each of the support columns 135. The nitrogen flows up through the columns 135 and from the top of the columns 135 the nitrogen is fed to the top of the columns 146 through hollow beams 330. The nitrogen then flows down through the columns 146 and is fed from the bottom of the columns 146 in pipes 331 to a hot nitrogen ring main 332. From the ring main 332 the nitrogen is fed in equispaced ducts 333 through the vault wall 302 to twelve oil cooled heat exchangers 334 associated with the fans 326. The cooled nitrogen is then recirculated by the fans 326.

The fans 326 are connected in parallel and each fan is fitted with a shutter to prevent nitrogen being bypassed if any of the fans are not in operation.

The oil in the heat exchangers 334 is cooled by circulation by a pump through water cooled heat exchangers, the pump and the heat exchangers being located in the secondary heat transfer system heat exchanger house.

The inner ring of reactor vessel support columns 135 and the outer ring of inner neutron support columns 146 are interconnected radially by the beams 330, beams 335, and tangentially by beams 335a.

The reactor vessel 3 is supported from a flange 336 by rollers 337 located between pads 338 on the top of the support columns 135.

A circular plate 339 supported on beams 340, and plates 341 located between the support columns 135 and 146 form a support structure for the graphite bricks of the inner neutron shield. The upper plates 341 have holes 342 for the instrument tubes 138 (FIG. 9).

An auxiliary instrument cooling system is also provided to cool the instrument tubes 138.

The auxiliary instrument cooling system comprises two nitrogen circulating fans 343 (FIG. 22) mounted on a platform 344 above the level of the vault roof 303. The fans 343 deliver nitrogen via a pipe 345 to a cold nitrogen ring main 346 mounted on the vault roof 303. From the ring main 346 twelve pipes 347 feed the nitrogen to the instrument tube inlets 142. Twelve pipes 348 feed the hot nitrogen from the instrument tube outlets 143 to a hot nitrogen ring main 349 from which the nitrogen is fed via a pipe 350 to oil cooled heat exchangers 351 associated with the fans 343. The cooled nitrogen is recirculated by the fans 343.

Each fan 343 is fitted with a shutter to prevent nitrogen being bypassed if one of the fans is not in operation.

The oil in the heat exchanger 342 is cooled by circulation by a pump through water cooled heat exchangers, the pump and the heat exchangers being located in the secondary heat transfer system heat exchanger house.

The Rotating Shields 5 and 6

The rotating shields 5 and 6 seal the top of the reactor vessel 3 and also permit access to the fuel elements of the core 1 and the breeder elements of the blanket 2 for charging and discharging by the machine 7.

The outer shield 5 (FIGS. 23, 23A and 23B) is located in the cylindrical support vessel 148 located in the reactor vessel 3. The centre line 624 of the shield 5 about which the shield 5 may be rotated is also the centre line of the reactor core. The shield 5 comprises an outer cylinder 352, an inner eccentric cylinder 353, a circular top end plate 354, and a circular bottom end plate 355, the end plates 354 and 355 being welded to the cylinders 252 and 353, and each end plate 354 and 355 having a hole corresponding to the inner cylinder 353.

The inner shield 6 is located in the inner cylinder 353 of the shield 5. The centre line of the shield 6, about which the shield 6 may be rotated, is indicated at 625. The inner shield 6 comprises an outer cylinder 356, eccentric inner cylinders 357 and 358 and a circular bottom end plate 359, the end plate 359 being welded to the cylinders 356, 357, 358 and having holes corresponding to the cylinders 357 and 358. The outer cylinder 356 has a top end plate 360 welded to the cylinders 357, 358 and having holes corresponding to the cylinders 357 and 358 and the cylinder 357 has a top end plate 361 welded to the cylinder 358 and having a hole corresponding to the cylinder 358, the rim of the plate 361 being sealed to a flange 362 on the plate 360.

To minimise the escape of primary coolant vapours from the reactor vessel 3, liquid metal seals 628 and 629 are provided between the support vessel 148 and the outer shield 5 and between the inner shield 6 and the outer shield 5 respectively.

The three vertical flanges 363 of the support vessel 148 form inner and outer compartments 365 and 366, which are part filled with liquid metal. The outer shield top end plate 354 has two vertical flanges 367 which project downwardly and are part immersed in the liquid metal, thus forming two liquid metal seals 628 between the support vessel 148 and the outer shield 5.

The outer shield top end plate 354 also has three vertical flanges 368 which project upwardly, the outer flange 368 being welded to radial beams 369 which are also welded to a flange 370 on the outer shield top end plate 354. The three flanges 368 form inner and outer compartments 371 and 372, which are part filled with liquid metal. The inner shield top end plate 360 has two flanges 373 which project downwardly and are part immersed in the liquid metal, thus forming two liquid metal seals 629 between the inner shield 6 and the outer shield 5.

The liquid metal in the inner compartments 365 and 371, is 60% by weight mercury and 40% by weight sodium, thus minimising amalgamation with the primary coolant vapours, and the liquid metal in the outer compartments 366 and 372 is mercury, thus allowing for slight pressure differences between the interior and exterior of the reactor vessel 3 during charging or discharging operations.

Liquid metal storage tanks 374 with associated feed pipes 375 are provided for the inner shield liquid metal seals 629. Similar provision is made for the outer shield liquid metal seals 628, as indicated by storage tanks 376.

The outer shield 5 is supported on, and may be rotated on, twelve equispaced conical rollers 377. The shield 5 is supported through the top end plate 354, a bearing flange 378 being provided. The rollers 377 are supported in brackets 379 which are mounted on pads 380 located on the annular plate 364.

The inner shield 6 is supported on, and may be rotated on, six equispaced conical rollers 381. The inner shield is supported through the top end plate 360, a bearing flange 382 being provided. The rollers 381 are supported in brackets 383 which are mounted on pads 384 located on the radial beams 369.

A sealing plug 385 having a central hole 386 is located in the inner cylinder 357 of the inner shield 6.

The hole 386 permits access to the fuel elements of the core for charging and discharging purposes, the boundary of the reactor core being indicated at 626 (FIG. 23B). The inner cylinder 358 of the inner shield 6 forms a hole 387 which permits access to the breeder elements of the blanket for charging and discharging purposes, the boundary of the reactor blanket being indicated at 627 (FIG. 23B).

The outer shield 5 is rotated by a drive motor through gears which engage with a gear ring 388 mounted on an annular plate 412 located on a flange 411 of the plate 354. Three equispaced rollers 389 are provided to centralise the shield 5 during rotation. A circular graduated scale 390 is provided to indicate the position of the shield 5, the scale 390 being mounted on a circular bracket 413 located on the plate 412.

The inner shield 6 is rotated by a drive motor through gears which engage with a gear ring 391 mounted on an annular plate 416 located on the flange 362 of the plate 360. Three equispaced rollers 392 are provided to centralise the shield 6 during rotation. A circular graduated scale 393 is provided to indicate the position of the shield 6, the scale 393 being mounted on a circular bracket 417 located on the plate 416.

A liner tube 394 is provided for the holes 386, 387 during charging and discharging operations.

When the reactor is in operation, the outer shield 5 is mechanically sealed to the reactor vessel 3, the inner shield 6 is mechanically sealed to the outer shield 5, the liner tube 394 is removed, and the holes 386 and 387 are sealed by sealing plugs 395.

An annular plate 396 is sealed by two silicone rubber sealing rings 397 of D shaped section to the flange 336 of the reactor vessel 3. Twelve equispaced jacks 398 mounted on plates 399 on the annular plate 396 are provided to raise the outer shield 5 from the rollers 376 to form a mechanical seal between the annular plate 396 and a flange 400 on the outer shield top end plate 354, two silicone rubber sealing rings 401 of D shaped section being provided.

An annular plate 402 is sealed by two silicone rubber sealing rings 403 of D shaped section to the flange 370 on the outer shield top end plate 354. Nine jacks 404 mounted on plates 405 on the annular plate 402 are provided to raise the inner shield 6 from the rollers 381 to form a mechanical seal between the annular plate 402 and a flange 406 on the inner shield top end plate 360, two silicone rubber sealing rings 407 of D-shaped section being provided.

The twelve jacks 398 are raised by drive motors through gears engaging with a roller mounted gear 408 which engages with gear wheels 409 on the jacks 398. The gear 408 is located in a gear housing 410 located by the flange 411 and the plate 412.

The nine jacks 404 are raised by drive motors, through gears engaging with a roller mounted gear 414 which engages with gear wheels 415 on the jacks 404. The gear 414 is located in a gear housing 418 located by the flange 362 and the plate 416.

The sealing plug 395 in the hole 387 comprises a tube 419 of circular cross section, the tube 419 having a top end flange 420, a circular bottom end plate 421 welded to the tube 419 and a circular top end plate 422 welded to the flange 420. The plug 395 is sealed to an annular plate 423 welded to the plate 361, bolts 424 and a sealing ring 425 being provided. The tube 419 is filled with a layer of graphite 426, a layer of mild steel 427 and a layer of thermal insulating material 428.

The plug 385 comprises an outer cylinder 429, an inner cylinder 430 which lines the hole 386, a circular bottom end plate 431 welded to the cylinders 429 and 430 and having a hole corresponding to the cylinder 430, and a flanged circular top end plate 432 welded to the cylinders 429 and 430 and having a hole corresponding to the cylinder 430. The plug 385 is sealed to the plate 361, a circular bracket 433 and bolts 434 being provided.

The liner tube 394 has a flanged end 435 and is sealed to the plate 432, a sealing ring 436 being provided. The tube 394 is held by the weight of the charging and discharging machine when in position.

The plug 385 houses the six boron shut off rod mechanisms 438.

The boron shut off rod mechanisms 438 hold the boron shut off rods 437 (FIG. 24) above the reactor blanket, provide means for dropping the shut off rods 437 into the reactor blanket and provide means for withdrawing the shut off rods 437 from the reactor blanket.

Each boron shut off rod mechanism 438 is housed in a structural tube 439, the plate 431 having a hole corresponding to each tube 439, and each tube 439 being welded at its lower end to the plate 431. The top end of each tube 439 is sealed in a plate 440 having a hole corresponding to each tube 439.

Each boron shut off rod mechanism 438 comprises a tubular sleeve 441 housing a differential screw drive mechanism 442 which drives a central snout rod 443 having engagement with the upper end of one of the boron shut off rods 437 (FIG. 24).

The differential screw drive mechanism 442 is driven through a hermetic coupling 444 from a gear box 445, gears 446 and a drive motor 447 being provided. Gears 448 and a position indicator 449 are also provided. The position indicator 449 is linked to the control room outside the reactor sphere.

The complete withdrawal of one of the boron shut off rods by one of the mechanisms 438 completes a magnetic circuit through magnetic windings which are housed in the enlarged portion 441a of the sleeve 441 whereby the boron shut off rod is held electromagnetically. De-energising of the magnetic circuit by operating a switch in the control room outside the reactor sphere releases the boron shut off rod 437 which falls by gravity into the reactor blanket.

A port 450 permits access to such components as the gear box 445 and the drive motor 447. A sealing plate 451 is provided over the port 450.

The six boron shut off rod mechanisms 438 are equi-spaced in the plug 385 and are positioned to release the boron shut off rods to fall into channels in the inner section of the reactor blanket.

The plug 385, the outer shield 5 and the inner shield 6 are each filled with a layer of graphite 426, a layer of mild steel 427 and a layer of thermal insulating material 428.

Each one of the six boron shut off rods 437 (FIG. 24) comprises cylindrical rods 452 of the boron isotope of mass number ten, a stainless steel outer tubular sheath 453 for the rods 452, stainless steel plugs 454 and 455, a high speed steel bottom end rod 456, and a stainless steel top end rod 457 having a mild steel head 458.

The plugs 454 and 455 are welded to the sheath 453, the end rod 456 is screw fitted to the plug 455 and secured by a locking pin 459, the end rod 457 is welded to the plug 454, and the head 458 is screw fitted to the rod 457 and secured by a locking pin 460.

The head 458 has an undercut portion 461 for engagement with the snout rod 443 (FIG. 23) during withdrawal of the shut off rod 437 from the inner section of the reactor blanket.

The Charging and Discharging Machine 7

The machine 7 is provided for charging and discharging the fuel elements of the core 1 and the breeder elements of the blanket 2.

The machine 9 (FIG. 25) comprises a structural tube 462, a rack tube 463, and a carrier rod 464 attached to a snout rod 465. The rack tube 463 is raised or lowered in the structural tube 462 by a rack tube pinion drive 466 housed in an oil lubricated gearbox 467. The carrier rod 464 and snout rod 465 are raised or lowered relative to the rack tube 463 via a continuous chain 468, the chain 468 passing over fixed sprockets 469 at the ends of the rack tube 463 and being connected to a roller mounted carriage 470, to which the carrier rod 464 is attached. The chain 468 is driven through a gear wheel train 471 located in the gear box 467. The gear wheel train 471 also provides for tensioning to take up any stretch occurring in the chain 468. The snout rod 465 engages the upper ends of the fuel elements or the breeder elements during charging and discharging operations.

The lower end of the structural tube 462 and the gear box 467 are surrounded by layers of lead shielding 472 to provide protection against radioactive radiation during discharging operations when fuel or breeder elements are raised into the structural tube 462.

It is necessary to cool the fuel or breeder elements during discharging operations due to the heat evolved by fission product decay, and a charge machine cooling system is thus incorporated.

The charge machine cooling system comprises a nitrogen circulating fan 473, a pipe 474 from the fan 473 and sealed to the top end of the structural tube 462, a pipe 475 from the lower end of the structural tube 462 and connected to a heat exchanger 476, a heat exchanger cooling fan 477 and a return pipe 478 from the heat exchanger 476 to the fan 473.

Nitrogen flows up the pipe 474, through the structural tube 462, and into the heat exchanger 476 via the pipe 475. From the heat exchanger 476 the nitrogen is returned to the circulating fan 473 via the pipe 478. The cooling fan 477 circulates air in the reactor sphere to cool the heat exchanger 476. An annular plate 479 mounted on the shielding 472 supports the heat exchanger 476 and the fan 473.

A drive motor 480 in a housing 481 is provided for the gear train 471 and the pinion drive 466. Instruments such as for example snout rod position indicators are housed in a compartment 482.

The machine 7 has a door 483 at its lower end operated through a screwed shaft 484 driven by a motor 485 through a hermetic coupling 486. The charge machine has a circular flange 487 having bolt holes 488.

Two jaws 630 (FIG. 25B) having end pieces 631 and slots 632 are mounted on, and may pivot about, a pin 633 through the snout rod 465. A tube 634 has a guide tube 635 and a stud 636 which engages with the slots 632.

Movement of the tube 634 relative to the rod 465 in one direction raises the stud 636 in the slots 632 whereby the end pieces 631 of the jaws 630 open and engage as shown with the undercut portion 39a of the fuel element end fitting 33. Movement in the other direction lowers the stud 636 in the slots 632 thereby closing the end pieces 631 of jaws 630 and disengaging the end fitting 33. The snout rod 465 has a tapered end piece 637 which guides the snout rod 465 into the mouth 41 of the end fitting 33. The end fittings of the breeder elements are similarly engaged, as are the heads of the boron shut off rods by the boron shut off rod snout rod.

An adaptor 489 (FIG. 26) is provided for use during charging and discharging operations. The adaptor 489 comprises a door 490 of circular cross section, a circular plate 491 supported from the door 490 by a spring 505, the door 490 having wedges 492 and the plate 491 having wedges 493 and a sealing ring 494, and a housing 495 for the door 490, the housing 495 having a stop 496. The door 490 is operated through a screwed shaft 497 driven by a motor 498 through a hermetic coupling 499. The adaptor 489 has a circular end flange 500 having bolt holes 501 and housing three equispaced wedges 502, the wedges 502 being manually operated through a screwed shaft 503 having an operating wheel 504.

In operation, as the door 490 is advanced in the housing 495, the plate 491 meets the stop 496 and the wedges 492 mate with the wedges 493, thus raising the plate 491 and effecting a seal between the plate 491 and the housing 495 through the sealing ring 494.

Two chambers 506 (FIG. 27) are also provided for use during charging and discharging operations. One chamber 506 houses one of the plugs 395 (referred to in FIG. 23) and one chamber 506 houses the liner tube 394 (also referred to in FIG. 23).

Each chamber 506 comprises an inner cylinder 507, an outer cylinder 508, an upper annular flange 509 welded to the cylinders 507 and 508, and a lower annular flange 510 welded to the cylinders 507 and 508. The inner cylinder 507 houses an electrically operated grab 511 which has three equispaced guide fins 512, and the annular space between the cylinders 507 and 508 is filled with lead shielding 513. The grab 511 is raised and lowered in the cylinder 507 by cables 514 wound on a cable drum 515 in a housing 516. The cable drum is driven by a motor 517 through a hermetic coupling 518. The motor 517 is supported on the flange 509. The chamber 506 has a door 519 at its lower end, the door 519 being surrounded by a housing 520 of lead shielding. The door 519 is operated through a screwed shaft 521 driven by a motor 522 through a hermetic coupling 523. The chamber 506 has a circular end flange 524 having bolt holes 525.

The Crane 8

The crane 8 is principally provided to move the machine 7 within the reactor sphere 12 but is capable of fulfilling a variety of other operations within the reactor sphere 12.

The crane 8 (FIG. 28) comprises a horizontal support frame 526, vertical legs 527, a main lifting hook 528 and an auxiliary lifting hook 529.

The legs 527 have wheels 530 running in a circular track 531 supported by sleepers 532 on the top of the vault wall. The wheels are driven by resistance linked motors 533, thus rotating the crane 8. The hooks 528 and 529 are raised and lowered by cables 534, and the hooks 528 and 529 may be moved along the length of the frame 526 by carriers 535 mounted on a track 526, drive motors 537 and gear wheels 538 being provided.

Support structures 539 and 540, built up from the platform 310 are also shown in FIG. 28. The structures 539 and 540 support the platform 344, which is also supported from the vault roof 303. The structures 539 and 540 also support a storage building 541 used during the transit of fuel elements or breeder elements discharged from the reactor core or blanket respectively.

The storage building 541 (FIG. 29) comprises concrete shielding 542, doors 543 providing access to the building 541 for the charging and discharging machine, a door 544 providing access to the building 541 for a transit flask, a compartment 545 housing a welding machine, and a container 546 of lead for stainless steel cans containing fuel elements or breeder elements. The container 546 may be pivoted and moved within the building 541 as indicated by the position of the container 546 shown by dotted lines 547. Fitted to the building 541 is a drum 548 of circular cross section having channels 549 which can accommodate stainless steel cans containing fuel elements or breeder elements. Operating wheels 550 are provided for the rotation of the drum and the insertion of fuel elements or breeder elements from the channels 549 into the container 546, an access door 551 being provided in the building 541.

The Sphere 12 and the Air Lock and Bridge 13

A reinforced concrete raft 552 (FIG. 30A) housed at ground level in a reinforced concrete foundation 553 supports the reactor sphere 12 and the concrete biological shield 11 through a central support column 554 and a double-walled annular skirt 555. The biological shield 11 is reinforced by steel frames 556 and clad with inner and outer steel plates 557 and 558, the plates 557 and 558, being welded to the frames 556. A steel reinforced solid concrete block 559 of circular cross section is formed integral with the shield 11. A sphere drainage port 570 sealed by a welded end cap 571 is also shown in FIG. 30A.

The central support column 554 comprises hollow support cylinders 560 and 561 (FIG. 30B) a circular top end plate 562 and an annular bottom end plate 563. The top end plate 562 is welded to the top of the cylinder 560 and a continuous circular stiffener plate 564 is welded to the plate 562. Twenty-four equispaced radial stiffener plates 565 are welded to the end plate 562 and to the stiffener plate 564. The plate 564 and the plates 565 are welded to the steel reinforcement of the block 559 (FIG. 30A). The cylinder 560 (FIG. 30B) has four equispaced access ports 566 and is welded at its lower end to the inner wall of the sphere 12. The annular bottom plate 563 is welded to the bottom end of the cylinder 561 and is secured to the concrete raft 552 by grouted bolts 567. Twenty-four equispaced radial stiffener plates 568 are welded to the end plate 563 and to the cylinder 561. The cylinder 561 has four access ports 569 and is welded at its upper end to the outer wall of the sphere 12. The port 570 and end cap 571 are also shown in FIG. 30B.

The skirt 555 (FIG. 30A) comprises inner hollow support cylinders 572 and 573 (FIG. 30C), outer hollow support cylinders 574, 575, an annular top end plate 576 and an annular bottom end plate 577. The end plate 576 is welded to the top ends of the cylinders 572 and 574 and three equispaced circular stiffener plates 578 are welded to the end plate 576. One hundred and eight equispaced radial stiffener plates 579 are welded to the end plate 576 and to the stiffener plates 578. The stiffener plates 578 and 579 are welded to the steel frames 556 (FIG. 30A). Three equispaced circular stiffener plates 580 (FIG. 30C) are also welded to the end plate 576. The cylinders 572 and 574 each have sixteen equispaced access ports 581 and are welded at their lower ends to the inner wall of the sphere 12. The end plate 577 is welded to the bottom ends of the cylinders 573 and 575 and is secured to the raft 552 by grouted bolts 582. One hundred and eighty equispaced radial stiffener plates 583 are welded to the end plate 577 and to the cylinders 573 and 575. The cylinders 573 and 575 each have sixteen equispaced access ports 584 and are welded at their upper ends to the outer wall of the sphere 12.

The sphere 12 (FIG. 30D) comprises a bottom crown plate 585, a top crown plate 586 and ten courses 587 of plates 588, all plates being welded to adjacent plates. An air lock port 589 and a flange 590 supported from the sphere 12 by welded support girders 591 are provided for the air lock and bridge 13. A circular platform 592 having a hand rail 593 is supported from the sphere 12 by welded support girders 594. The air lock and bridge 13 provides access to the interior of the sphere 12 from a storage building outside and immediately adjacent to the sphere 12 and seals the interior of the sphere 12 during reactor operation. The storage building supports the air lock and bridge 13 and houses new and discharged fuel and breeder elements. The cylinders 561 and 575, the access ports 569 and 584, the radial stiffener plates 568 and 583 and the end plates 563 and 577 are also shown in FIG. 30D.

*Electrical Supplies*

The supply of electricity to the reactor plant is divided into three sections. The first section is concerned with the supply of electricity to the main heat extraction plant. For this purpose, the main heat extraction plant is considered as twelve heat extraction units, each unit comprising two of the primary electromagnetic pumps 158, two of the secondary electro-magnetic pumps 237, one of the biological shield circulating fans 309, one of the reactor vessel support circulating fans 326, one of the steam raising feed pumps 270 and one of the steam raising circulating pumps 276. Each heat extraction unit is supplied with electricity from a unit electrical circuit. Eighteen conventional alternator sets in a diesel generator house are provided for the unit circuits, the eighteen alternator sets being arranged in groups of three, each being associated with two unit circuits. In each group of three alternators one can supply either of the associated circuits, and the other two supply one circuit each. Thus for every two circuits there is an additional alternator available for standby or maintenance.

The second section is concerned with the supply of electricity to control gear, instruments and other plant. These are supplied by direct current transformed and rectified from the national A.C. mains supply, continuity of supply for a limited time in case of mains supply failure being obtained by having a battery in the circuit. A transformer is located in a transformer house near to the diesel generator house. Two direct current circuits are provided, one of 240 volts and one of 50 volts. The 240 volt circuit supplies electricity to the twelve control rod motors 107, the two instrument cooling fans 343, the charge machine drive motor 480, the charge machine door motor 485, the charge machine cooling fans 473 and 477, the plug chamber and liner chamber motors 517 and 522, the adaptor door motor 498 and the boron shut off rod drive motors 447. The 50 volt D.C. circuit supplies electricity for instrumentation purposes.

The third section is concerned with the supply of electricity to all other reactor plant. This is supplied from the mains supply in the normal way, six standby diesel alternators being provided to supply this load and the D.C. load in the event of failure of the mains supply. The six standby diesel alternators are similar to the unit circuit diesel alternators and are situated alongside them in the diesel generator house.

Copper sheathed electrical cables 595 (FIG. 31) carrying electricity to plant within the reactor sphere are passed through ports 596 in the sphere plates 588 in adaptors 597. Each adaptor 597 comprises a tube 598 with an outwardly extending skirt 599 and a sleeve 600 welded to the end of the skirt 599.

The tube 598 has screw threaded end sockets 601 and the skirt 599 is formed integral with the tube 598. The sleeve 600 is joined to the skirt 599 at a weld 602 and is also joined to the plate 589 at a weld 603. The cable 595 is passed through the tube 598 and is sealed in the tube 598 by conical seals 604 in the sockets 601, the seals 604 being secured by nuts 605. After tightening, the nuts 605 are tack brazed to the ends of the tube 598. The adaptor 597 may be modified to carry more than one cable 595. Similar adaptors are used for instrument cables passing through the reactor sphere.

*Coolant Storage House*

A coolant storage house situated outside the reactor sphere is provided with electrically heated furnaces to melt the solid sodium metal. The liquid metal is then filtered into a heated discharge tank from which it is passed to the primary and secondary circuit charge tanks 198 and 245 using compressed nitrogen. The charge tanks 198 and 245 are heated to prevent the coolant freezing. The coolant storage house is also provided with muffle furnaces to melt the solid sodium and potassium metals used to form the eutectic alloy used in the thermal syphon heat exchanger system. The eutectic alloy is then filtered into a discharge tank from which it is passed to the storage tank 196 using compressed nitrogen.

Air heaters are provided to heat the reactor vault during coolant charging of the primary heat transfer system from the charge tanks 198 and lagged heating elements are provided for the secondary heat transfer system during coolant charging from the tanks 245.

The pipes 231 carrying hot intermediate liquid metal coolant are passed through ports 606 (FIG. 32) in the sphere plates 588 in adaptors 607. Each adaptor 607 comprises a stainless steel pipe 608 with an outwardly extending stainless steel skirt 609 and a mild steel sleeve 610.

The skirt 609 is formed integral with the pipe 608. The sleeve 610 is coated at one end with a chromium/nickel electrode 611 and joined to the skirt 609 at a weld 612 with a backing strip 613 in position. A sleeve 614 is joined to the sphere plate 589 at a weld 615 and the sleeve 614 is joined to the sleeve 610 at a weld 616.

The pipes 231 are welded to the ends of the pipe 608. Leak jacket pipes 617 concentric with the pipe 608 are welded to collars 618 and 619 at the ends of the pipe 608.

Similar adaptors are used for passing the pipes 190, 194, 197, 200, 239 and the various cooling system oil carrying pipes through the reactor sphere.

Operation

Assembly prior to reactor start up is in three main stages, firstly charging the core 1 and the blanket 2 with natural uranium loaded fuel elements and breeder elements respectively, secondly filling the primary and secondary heat transfer systems with liquid metal coolant, and thirdly critical assembly of the core 1.

In the first stage, natural uranium loaded fuel elements are charged into the core 1, the majority being charged by hand. At the same time, the breeder elements are charged into the blanket 2, the majority being charged by hand. The control assembly carrier frames 51 are first charged with fuel elements, thus permitting the control assemblies and drive mechanism to be tested. The remaining fuel elements and breeder elements are then charged into the core 1 and blanket 2 respectively using the machine 7. This permits the mechanical operation of the machine 7 to be adequately tested without the added complication of having liquid metal coolant in the circuit.

Throughout the assembly a positive element identification system is used indicating the exact position of each element and exactly what fuel each element contains.

In the second stage, with the rotating shields 5, 6, mechanically sealed in the reactor operating position and the shield holes 386 and 387 sealed by the plugs 395, the reactor vessel 3 and the primary heat transfer system are purged with nitrogen and are then charged with liquid sodium metal coolant from the charge tanks 198. The primary nitrogen blanket system is then pressurised. The thermal syphon heat exchange system is purged with nitrogen and filled with liquid sodium, potassium eutectic alloy from the charge tank 196. The secondary heat transfer system is purged with nitrogen and filled with liquid sodium metal coolant from the charge tanks 245.

At this stage the boron shut off rods 437 and drive mechanisms 438 are tested and the control assemblies and drive mechanisms are retested.

In the third stage, critical assembly leading to reactor start up is achieved by interchanging natural uranium loaded fuel elements in the core 1 for enriched uranium fuel elements 14 in groups, sealing the reactor after each exchange and taking counts on the neutron flux recorders in the control room to indicate the approach to criticality.

The general method of the critical assembly is that the control carrier fuel elements are interchanged first, followed by the elements in the core spaces between the control assemblies thus forming an annulus of enriched fuel elements at the outer edge of the core 1. The remaining core elements are then interchanged working in groups outwardly from the centre of the core 1. The reactor is sealed after each exchange and counts are taken on the neutron flux recorders as follows:

(a) With all twelve control assemblies out of the core 1,
(b) With two of the control assemblies in the core 1,
(c) With six of the control assemblies in the core 1, and
(d) With all twelve control assemblies in the core 1.

When finally charged, the core 1 contains sufficient enriched fuel elements 14 to make the reactor diverge with most of the control assemblies out of the core 1.

Since the primary heat transfer system is charged with liquid sodium coolant, the machine 7 is used for all fuel element interchanging. The sequence of operations for interchanging one core element is as follows:

(a) Release the secondary nitrogen blanket pressure to atmospheric pressure.
(b) Reduce the primary nitrogen blanket pressure to 0.5 p.s.i.g.
(c) Release the mechanical seals on the rotating shields 5 and 6 and lower the shields 5 and 6 on to the rollers 377 and 381.
(d) Orientate the shields 5 and 6 to the desired position.
(e) Remove the plug 395 in the inner rotating shield hole 386.
(f) Fit the liner tube 394 in the hole 386.
(g) Fit the machine 7 in position on the shield 6.
(h) Remove a natural uranium loaded element from the core 1 into the machine 7.
(i) Transport the machine 7 by the crane 8 to the storage building 541 and there remove the element from the machine 7 and replace it with an enriched fuel element 14.
(j) Transport the machine 7 back to the shield 6, fit the machine 7 in position and charge the enriched element 14 into the core 1.

The shields 5 and 6 are re-orientated and operations (h), (i), (j) repeated.

After the final interchange of fuel elements, the reactor is sealed and reactor start up is controlled by varying the position of the control assemblies in the core 1 from the control room. During reactor start up, the heat transfer systems are tested and heat generated is rejected through the heat exchanger 286.

Once steady operation at a given power level is achieved, the heat generated is used to raise the steam in the steam raising circuits and the steam is used to generate electricity in the turbine 282.

Changes of power level involve adjustment of the position of the control assemblies with respect to the core to raise or lower the power, accompanied by adjustment of the coolant flow in order to maintain desired temperature conditions.

Reactor shut down, prior to discharging fuel elements 14 or breeder elements 109, is achieved by withdrawing the control assemblies from the core 1. The sequence of operations for the discharge of one fuel element 14 is as follows:

(a) Reduce the pressure in the secondary nitrogen blanket system to atmospheric pressure.
(b) Reduce the pressure in the primary nitrogen blanket system to 0.5 p.s.i.g. As the pressure in the primary nitrogen blanket system is reduced liquid metal is fed automatically into the liquid metal seals 628 and 629. This action is automatic since the pressure in the liquid metal storage tanks 374 and 376 is kept at 50 p.s.i.g. and as the primary nitrogen blanket pressure is reduced the liquid metal is forced out of the storage stankes 374 and 376 into the seals.
(c) Purge the annular spaces between the liquid metal seals and the mechanical seals on the shields 5 and 6 with nitrogen.
(d) Release the mechanical seals on the shields 5 and 6 and lower the shields 5 and 6 on to rollers 377 and 381.
(e) Orientate the shields 5 and 6 so that the plug 395 is located above the element 14 to be discharged.
(f) Fit the adaptor 489 above the plug 395 and retain the plug 395 in position by the wedges 502. Open the adaptor door 490 and release the plug retaining bolts 424.
(g) Lower the plug chamber 506 on to the adaptor 489 using the crane 8 and secure the plug chamber 506 to the adaptor 489.

(h) Purge the space between the door 519 and the door 490 with nitrogen.

(i) Open the door 519, release the wedges 502 and raise the plug 395 into the plug chamber 506. Close the doors 490 and 519 and purge the space between the doors 490 and 519 with nitrogen.

(j) Remove the plug chamber 506 from the adaptor 489 and transport the plug chamber 506 to storage.

(k) Fit the liner tube chamber 506 to the adaptor 489 and purge the space between the doors 490 and 519 with nitrogen.

(l) Open the doors 490 and 519 and lower the liner tube 394 into position.

(m) Close the doors 490 and 519, purge the space between the doors 490 and 519 with nitrogen and remove the liner chamber 506 to storage.

(n) Fit the machine 7 above the adaptor 489 and purge the space between the doors 483 and 490 with nitrogen.

(o) Open the doors 483 and 490, raise the fuel element 14 by the machine 7 with the cooling system of the machine 7 in operation.

(p) Close the doors 483 and 490, purge the space between the doors 483 and 490 with nitrogen, disconnect the machine 7 from the adaptor 489 and transport the machine 7 to the storage building 541 using the crane 8.

(q) Fit the machine 7 above one of the storage building doors 543 and purge the space between the doors 493 and 543 with nitrogen.

(r) Open the doors 483 and 543 and discharge the fuel element 14 into a stainless steel can in the container 546.

(s) Move the container 546 to the compartment 545 and weld a lid on to the stainless steel can containing the discharged fuel element 14.

(t) Move the container 545 to the door 544.

The discharged fuel element is now ready to be charged into the transit flask and to be removed from the sphere 12 through the air lock and bridge 13 to the storage building outside the sphere 12.

Having discharged a fuel element 14 as outlined above, the sequence of operations for charging one new fuel element 14 into the core 1 is as follows:

(a) Rotate the container 546 to a horizontal position, open the door 551 and charge a new fuel element 14 in a stainless steel can into the container 546 from the drum 548, then close the door 551.

(b) Rotate the container 546 to a vertical position and move the container 546 to the compartment 545 and remove the lid from the stainless steel can containing the new fuel element 14.

(c) Move the container 546 to the door 543 under the machine 7 and raise the fuel element 14 into the machine 7.

(d) Close the doors 483 and 543 and purge the machine 7 and the space between the doors 483 and 543 with nitrogen.

(e) Disconnect the machine 7 and transport the machine 7 by the crane 8 to the adaptor 489 on the shield 6.

(f) Fit the machine 7 above the adaptor 489 and purge the space between the doors 483 and 490 with nitrogen.

(g) Open the doors 483 and 490 and lower the fuel element 14 into the core 1, then close the doors 483 and 490.

The operations outlined above for the discharge of a fuel element from the core after reactor shut down followed by the charging of a new fuel element into the core are employed since the discharged fuel element will be generating heat due to fission product decay, the discharged fuel element will also bring out of the core some liquid metal, the primary blanket system nitrogen gas is highly radioactive, and it is desirable to prevent atmospheric oxygen entering the primary nitrogen blanket system.

*Reactor Dimensions and Operating Figures*

The core 1 is charged with four hundred and fifty one fuel elements 14, each four feet long. The enriched fuel 15 comprises tubes of enriched uranium, one to two inches long, 0.69 inch O.D. and 0.32 inch I.D. The overall length of enriched fuel 15 in each element 14 is twenty-one inches.

The blanket 2 is charged with one thousand nine hundred and ten breeder elements 109, each eight feet two inches long. The breeder element uranium rods 110 are six inches long and 1.28 inches in diameter. There are fourteen rods 110 to each element 109.

The reactor vessel 3 is of stainless steel construction, and is ten feet six and three-quarter inches I.D., ten feet eleven and three-quarter inches O.D. and approximately eighteen feet deep. The support structure within the vessel 3 is of stainless steel and the catchpot 621 is niobium sprayed stainless steel.

The primary heat transfer system is of stainless steel construction, the heat exchanger tube 156 being four inches I.D. and the heat exchanger tube 157 being six inches I.D.

The normal operating temperatures of the primary coolant are approximately 200° C. at inlet to the reactor vessel 3 and approximately 350° C. at outlet from the reactor vessel 3. When charged the primary heat transfer system contains approximately forty-four tons of liquid metal coolant.

The thermal syphon heat transfer system and the leak jacketing associated with the primary heat transfer system is of stainless steel construction.

The liquid metal side of the secondary heat transfer system is generally of stainless steel construction, the heat exchanger tubes 252 being 0.75 inch I.D. and the heat exchanger tube 251 being 0.870 inch I.D. in the preheater section, 1.375 inches I.D. in the evaporator section and 1.093 inches I.D. in the superheater section.

The normal operating temperatures of the secondary coolant are approximately 325° C. at inlet to the heat exchanger 234 and approximately 175° C. at outlet from the heat exchanger 234. When charged the secondary heat transfer system contains approximately fifty-nine tons of liquid metal.

The inner neutron shield 4 surrounding the reactor vessel 3 is approximately four feet thick and the concrete biological shield 11 is approximately five feet thick. The shield 11 is approximately forty-five feet high and the shield wall 302 has an internal diameter of sixty feet. The shield roof 303 has a twenty feet diameter central hole.

The cylinders 352 and 353 and the end plates 354 and 355 of the rotating shield 5 are of stainless steel construction and the cylinders 352 and 353 are 0.375 inch thick. The cylinder 352 is approximately seven feet in diameter and the cylinder 353 is approximately five feet in diameter. The shield 5 is approximately eight feet deep.

The cylinders 356, 357, 358 and the end plates 359, 360, 361 of the shield 6 are of stainless steel construction, and the cylinders 356, 357, 358 are 0.5 inch thick. The cylinder 356 is approximately five feet in diameter, the cylinder 357 is approximately two feet nine inches in diameter, and the cylinder 358 is approximately nine inches in diameter. The shield 6 is approximately eight feet thick.

The cylinders 429 and 430 and the end plates 431 and 432 of the annular plugs 385 are of stainless steel construction, and the cylinders 429 and 430 are 0.5 inch thick. The cylinder 429 is approximately two feet nine inches in diameter and the cylinder 430 is approximately nine inches in diameter.

The tubes 419 and the end plates 420 and 421 of the plugs 395 are of stainless steel construction, the tubes 419 being 0.5 inch thick. The tubes 419 are approximately nine inches in diameter.

The liner tube 394 is of stainless steel, is approximately nine inches in diameter and 0.5 inch thick.

The boron shut off rods 437 are approximately seven feet two inches overall length. The cylindrical boron rods 452 are two inches long and 0.94 inch diameter. The total length of the rods 452 in each rod 437 twenty-eight inches.

The machine 7, the adaptor 489 and the chambers 506 are in general of stainless steel construction.

The sphere 12 is of mild steel construction and the plates 585, 586, 588 vary in thickness from one inch to one and three-quarter inches. The sphere 12 is one hundred and thirty-five feet in diameter.

The sphere support column 554 and skirt 555 are of mild steel construction. The cylinders 560 and 561 of the support column 554 have an internal diameter of approximately ten feet and are 1.25 inches thick. The cylinders 572 and 573 of the skirt 555 have an internal diameter of approximately fifty-five feet and are 1.25 inches thick. The cylinders 574 and 575 of the skirt 555 have an internal diameter of approximately sixty-one feet and are 1.25 inches thick.

The concrete raft 552 from which the sphere 12 is supported is sixty-eight feet in diameter and varies in thickness from approximately five feet at the centre to approximately ten feet at the circumference.

We claim:

1. A nuclear reactor comprising a core of closely spaced vertically orientated cylindrical fuel elements, means defining control sections in said core, vertically movable control fuel element carrier frames accommodated in said control sections, groups of said fuel elements being supported in said carrier frames, said carrier frames and control sections being of triangular cross-section, rollers attached to the upper ends of said carrier frames, means defining roller bearing surfaces for said rollers in said control sections, said rollers being located on each carrier frame in two planes, three rollers in each plane at the corners of each carrier frame and arranged so that each face of each carrier frame exposes two rollers spaced apart from one another and in different planes, horizontal carrier arms below said core, said carrier frames resting on said carrier arms, vertical tubes external to said core, said tubes being connected at their lower ends to said carrier arms and at their upper ends to operating mechanisms for controlled movement of said carrier frames together with their groups of fuel elements into and out from said core, and releasable couplings in said operating mechanisms for releasing said carrier frames together with their groups of fuel elements to fall from said core under gravity.

2. A nuclear reactor as claimed in claim 1, wherein each of said carrier frames has a snout shaped end and each of said carrier arms has a shaped end piece for said snout shaped end.

3. A nuclear reactor as claimed in claim 1, wherein there are twelve equi-spaced carrier frames and said core is of regular hexagonal cross section, each corner of said core having two of said control sections.

References Cited in the file of this patent

UNITED STATES PATENTS 2,841,545 Zinn _____ July 1, 1958
2,885,893 Lane et al. _____ May 12, 1959

OTHER REFERENCES

Glasstone: "Principles of Nuclear Reactor Engineering," July 1955, I. Van Nostrand Company, Inc., page 320, paragraph 5.9.

Kendall et al.: "International Conferences on the Peaceful Uses of Atomic Energy," vol. 3, pp. 193–197; August 1955, U.N. Publication, N.Y.

Lichtenberger et al.: "International Conference on the Peaceful Uses of Atomic Energy," vol. 3, pp. 346–351, August 1955, U.N. Publication, N.Y.